United States Patent

Tanabe

[11] 3,891,677
[45] June 24, 1975

[54] 17α,20,20,21-BISMETHYLENEDIOXY-4,5-SECO-3-PREGNYNE-5-ONES

[75] Inventor: Masato Tanabe, Palo Alto, Calif.

[73] Assignee: Schering Corporation, Kenilworth, N.J.

[22] Filed: July 18, 1973

[21] Appl. No.: 380,319

Related U.S. Application Data

[60] Division of Ser. No. 102,095, Dec. 28, 1970, Pat. No. 3,796,728, which is a division of Ser. No. 647,315, June 20, 1967, Pat. No. 3,835,160, which is a continuation-in-part of Ser. No. 644,761, June 6, 1967, abandoned.

[52] U.S. Cl. .......................................... 260/340.9
[51] Int. Cl. ........................................... C07d 13/04
[58] Field of Search ............................... 260/340.9

[56] References Cited
OTHER PUBLICATIONS

Wieland et al., Chemical Abstracts, Vol. 68 (1968), 13257t.
Eschenmoser, Chemical Abstracts, Vol. 70 (1969), 88, 108,v.

*Primary Examiner*—Anton H. Sutto
*Assistant Examiner*—Richard L. Raymond
*Attorney, Agent, or Firm*—Mary S. King

[57] ABSTRACT

Steroidal 5-keto-4,5-seco-3-ynes of the estrane, androstane, and pregnane series are prepared from 3-keto-4-dehydro steroids via the 3-hydrocarbon-sulfonylhydrazono-4,5-oxido derivative thereof which undergoes fission and rearrangement in situ to form the 5-keto-4,5-seco-3-yne structure. The 6- and/or 10-hydrocarbon substituted-5-keto-4,5-seco-3-ynes are prepared by reacting a 6- and/or 10-unsubstituted-5-keto-4,5-seco-3-yne in an alkylating medium with a hydrocarbon sulfonate or, preferably, a hydrocarbon halide.

The steroidal 5-keto-4,5-seco-3-ynes of this invention are useful as intermediates in preparing pharmacologically valuable 6- and/or 10-hydrocarbon substituted-3-keto-4-dehydro steroids, e.g.

1. by reaction with mercuric acetate and sulfuric acid in acetic acid; or 2. by reaction with mercuric oxide and trifluoroacetic acid followed by treatment of the thereby formed 3,5-diketo-4,5-sec. steroid with potassium t-butoxide in t-butanol.

4 Claims, No Drawings

17α,20,20,21-BISMETHYLENEDIOXY-4,5-SECO-3-PREGNYNE-5-ONES

CROSS REFERENCE OF RELATED APPLICATIONS

This application is a division of copending application Ser. No. 102,095, filed Dec. 28, 1970, now U.S. Pat. No. 3,796,728, which, in turn, is a division of copending application Ser. No. 647,315, filed June 20, 1967, now U.S. Pat. No. 3,835,160 which is a continuation-in-part of application Ser. No. 644,761, filed June 6, 1967, now abandoned.

FIELD OF INVENTION

This invention relates to compositions of matter which may be classified in the field of chemistry as 3'-keto-2',3'-seco-1'(2')-yne steroidal derivatives possessing physiological activity, and which are also particularly valuable as intermediates in preparing other useful steroidal derivatives.

This invention also relates to processes for producing the novel 3'-keto-2',3'-seco-1'(2')-yne steroids, the basic process of which includes the steps whereby a 1'-keto-2'(3')-dehydro steroid wherein the 3'-carbon is disubstituted is converted to the corresponding 1'-hydrocarbonsulfonylhydrazono-2',3'-epoxy steroidal derivative, which derivative undergoes fission and rearrangement in situ in the reaction mixture to form a novel 3'-keto-2',3'-seco-1'(2')-yne steroidal compound of my invention.

SUMMARY OF INVENTION

The invention sought to be patented in its composition of matter aspect resides in the concept of a steroid (including steroids of the pregnane, androstane, estrane, cholestane, and sapogenin series) which possesses a 3'-keto-2',3'-seco-1'(2')-yne system or the corresponding 3'-hydroxy-2',3'-seco-1'(2')-yne system.

The preferred species of the composition of matter aspect of my invention are the 5-keto-4,5-seco-3(4)-yne steroidal derivatives (particularly of the androstane, estrane, and pregnane series) which possess physiological activity, and which are particularly valuable as intermediates in preparing pharmacologically active 3-keto-4-dehydro-steroids (many of which are known in the art) substituted at C-4 by a lower alkyl, or substituted at C-6 by a mono-, di-, or cyclic-hydrocarbon radical (including substituted hydrocarbon radicals) and/or at C-10 by a hydrocarbon radical.

General Description of the Product Aspect of the Invention

The invention sought to be patented in its broadest composition of matter aspect is the concept of a steroid (including members of the pregnane, androstane, estrane, cholestane and sapogenin series) which possess a 3'-keto-2',3'-seco-1'(2')-yne system or the corresponding 3'-hydroxy-2',3'-seco-1'(2')-yne system, and which may also possess hydrocarbon substituents having up to 12 carbon atoms on one or more carbon atoms adjacent said 5'-keto moiety.

In view of their method of manufacture, as discussed in detail hereinbelow, by my inventive concept, seco-steroids of this invention are contemplated as possessing the requisite 3'-keto-2',3'-seco-1'(2')-yne system (or 3'-hydroxy analog thereof) at any of those positions wherein it is known that a normal steroid may posses a 1'-keto-2',3'-dehydro system, (i.e. an α,β-unsaturated keto-system) and a tertiary carbon at C-3'. The concept of the composition of matter aspect of my invention thus includes the following species:

a. 1,2-seco-3(2)-yne-1-one steroidal derivatives (particularly steroids of the androstane and pregnane series).

b. 5,6-seco-7(6)-yne-5-one derivatives which are useful intermediates for introducing alkyl groups at C-4 and/or (when there is a 19-nor-steroid) at C-10.

c. 7,8-seco16(7)-yne-8-one derivatives which are useful intermediates for introducing alkyl groups at C-9 C-14, and also formaking C-9-iso- and C-14-iso-stereoisomeric derivatives.

d. 9,11-seco-12(11)-yne-9-one derivatives, particularly of the pregnane series.

e. 14,15-seco-17(16)-yne-14-one derivatives which are useful as intermediates when introducing alkyl groups at C-8. Compounds of formula Ie may also be converted to form C-8-iso-stereoisomeric derivatives.

f. The preferred species, i.e. the 5-keto-4,5-seco-3(4)-yne steroidal derivatives (particularly steroids of the androstane, pregnane, and cholestane series) are exemplified by 4,5-Seco-3-pregnyn-17α-ol-5,20-dione and 4,5-Seco-3-pregnyn-17α,21-diol-5,20 -dione.

The above listed species are indicated diagramatically below in Chart A wherein R is a member selected from the group consisting of hydrogen and methyl and R' represents a member selected from the group consisting of hydrogen and a hydrocarbon radical having up to 12 carbon atoms. It is understood that other functions, particularly at C-3 and C-17, may be present in the molecule.

CHART A

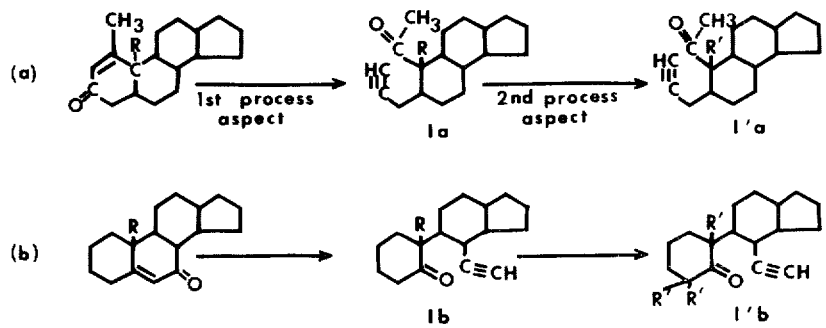

CHART A—Continued

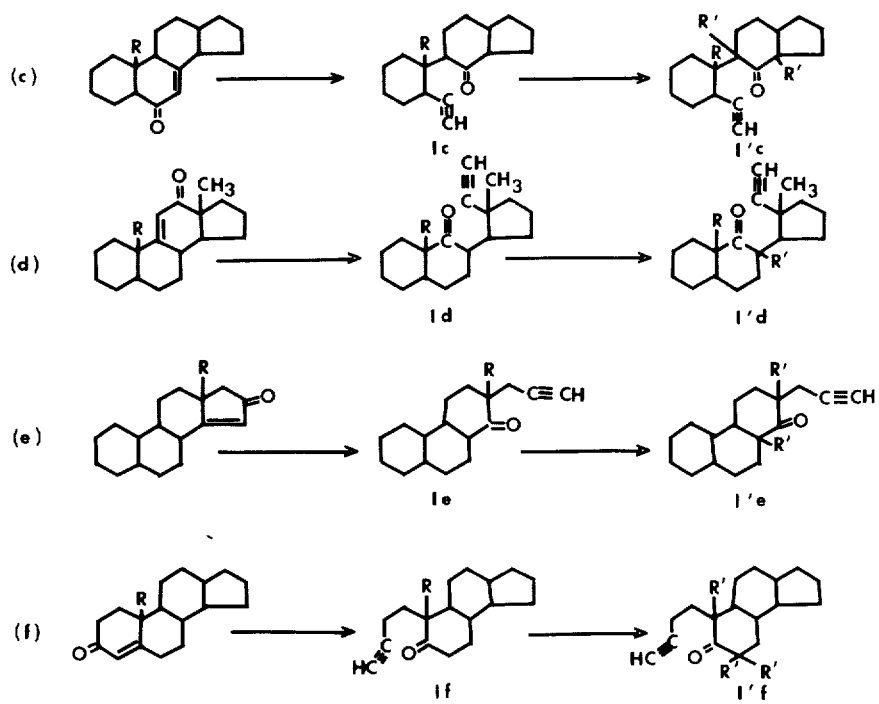

In above Chart A, the partial formulae in the first column represent α,β-unsaturated ketone (i.e. 1′-keto-2′(3′)-dehydro-) systems in normal steroids from which are derived novel seco structures, i.e. the 3′-keto-2′,3′-seco-1′(2′)-ynes represented diagramatically by formulae Ia-If which, in turn, are alkylated to form novel R′-substituted-3′-keto-2′,3′-seco-1′(2′)-ynes, represented diagramatically by formulae I′a-I′f.

Thus, there may be introduced hydrocarbon radicals at C-8 and C-10 in 9,11-seco-9-keto-11(12) ynes of formula I(d) to form 10-R′ and/or 14-R′ derivatives defined minimally by formula I′(d).

The preferred species of the composition-of-matter aspect of my invention are the 5-keto-4,5-seco-3(4)-yne steroidal derivatives and their 6 and/or 10-hydrocarbon derivatives. Included within this species are compounds having minimally, the following structural formula:

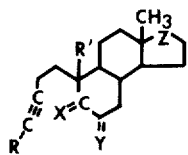

I wherein

X is a member selected from the group consisting of ketonic oxygen, (H,βOH), (H,β-lower alkanoyloxy), and (H,β-p-toluenesulfonyloxy);

R is a member selected from the group consisting of hydrogen and lower alkyl;

R′ is a member selected from the group consisting of hydrogen and a hydrocarbon radical having up to 12 carbon atoms;

Y is a member selected from the group consisting of hydrogen,

a polymethylene cyclic radical having from 2 to 8 carbon atoms, (H,β-formyl), and n-lower alkylthiomethylene; and Z is a member selected from the group consisting of keto,

(W being a member selected from the group consisting of hydrogen, lower alkyl, tetrahydropyranyl, lower alkanoyl, and A being a member selected from the group consisting of hydrogen, and lower alkyl,

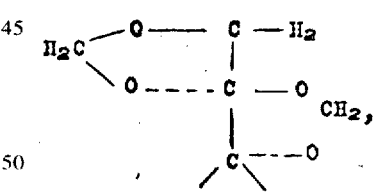

(T being a member selected from the group consisting of hydrogen and —OW′, and W′ being a member selected from the group consisting of hydrogen and lower alkanoyl).

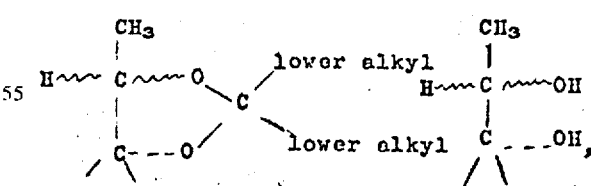

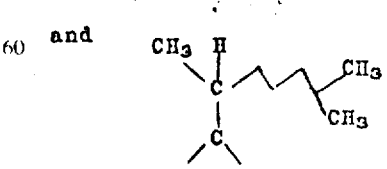

Included within the term "lower alkyl" as used in the specification and claims are saturated hydrocarbon radicals having up to four carbon atoms including straight chain and branched radicals such as methyl, ethyl, n-propyl, isopropyl, n-, iso-, and tert.-butyl.

The term hydrocarbon radical having up to 12 carbon atoms as used in the specification and claims encompasses saturated alkyl radicals, both straight chain and branched, having up to 12 carbon atoms such as methyl, octyl, n-dodecyl and like, unsaturated open chain radicals such as 2'-propenyl-, and 3'-butenyl; and cyclic hydrocarbon radicals such as cyclopropylethyl, cyclobutylmethyl, cyclopentyl; as well as, at C-6, spirocyclic hydrocarbon radicals which includes within the spiro ring structure the seco-steroid carbon at C-6, e.g. 6,6-dimethylene (i.e. 6-spiropropane or 6,6-ethylene) 6,6-trimethylene (i.e. 6-spirobutane), and 6,6-pentamethylene (i.e. spirohexane), and the like.

Typical compounds of the preferred species of the composition of matter aspect of my invention which are defined by above formula I include:

1. 6 and 10 unsubstituted seco-steroidal derivatives.
2. 6-unsubstituted-10β-alkyl- and 6-unsubstituted 10β-alkylene seco steroidal derivatives (i.e. wherein Y is hydrogen and R' is a hydrocarbon radical), such as 17,20;20,21-bis-methylenedioxy-4,5-seco-3-pregnyn-5-one and the 11-keto analog thereof, (i.e. wherein X is oxygen, R' is methyl, and Z is

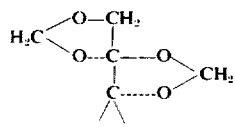

17α,20-isopropylidenedioxy-4,5-seco-3-pregnyn-5-one (i.e. wherein X is oxygen, R is H, R' is methyl and Z is

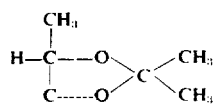

and
4,5-seco-3-pregnyne-5,20-dione, (i.e. wherein X is oxygen, and Z is

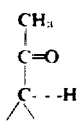

3. 6-substituted-10-unsubstituted seco steroids (i.e. R' is hydrogen, Y is formyl or 6-n-butylthiomethylene).
4. and 6 and 10-di- and tri-substituted compounds (i.e. both R' and Y are other than hydrogen) as exemplified by 6,6-dimethyl-17α,20-isopropylidenedioxy-4,5-seco-3-pregnyn-5-one

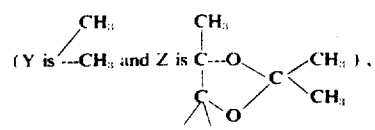

6,6-pentamethylene-17α,20-isopropylidenedioxy-4,5-seco-3-pregnyn-5-one

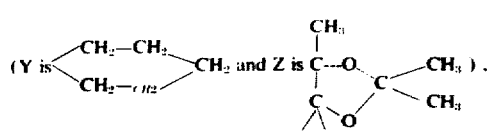

and
6,6-dimethyl-17α,20;20,21-bis-methylenedioxy-4,5-seco-3-pregnyn-5-one and the 11-keto derivative thereof (Y) is

and Z is

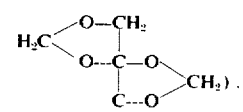

Utility of 4,5-Seco Compounds of this Invention

The 3'-keto-2',3'-seco-1'(2')-yne-steroids of my invention such as those represented diagramatically by formulae I (i a-f) and I' (a-f) in Chart A above, are useful mainly as intermediates in preparing new, substituted derivatives of the α,β-keto-steroids from whence they are derived (as represented diagramatically by the formulae listed in the first column in Chart A) via procedures discussed hereinbelow. Thus, utilizing compounds represented by formulae Ia and I'a, there are formed 1-methyl-10β-hydrocarbon (having up to 12 carbon atoms) substituted-3-keto-1-dehydro steroids;

from seco-compounds represented by formulae Ib and I'b, there are derived 7-keto-5-dehydro steroids substituted at C-10 and/or at C-4 by hydrocarbon radicals having up to 12 carbon atoms;

from seco-compounds represented by formulae Ic and I'c there are derived 6-keto-7-dehydro steroids substituted at 9 and/or at C-14 by hydrocarbon radicals having up to 12 carbon atoms;

from seco compounds represented by formulae Id and I'd there are derived 12-keto-9(11)-dehydro steroids substituted at C-10 and/or C-8 by a hydrocarbon radical having up to 12 carbon atoms;

from seco compounds represented by formula Ie and I'e, there are derived 16-keto-14-dehydro steroids substituted at C-8 by a hydrocarbon having up to 12 carbon atoms, from the preferred seco compounds of this invention as represented by formulae If and I'f in Chart A (and by formula I above), there are derived 6 and/or 10-substituted steroidal derivatives which are further discussed hereinbelow.

The 4,5-seco-3-yne-5-ones such as those defined by formula I (and formulae If and I'f in Chart A) are useful mainly as intermediates via novel processes disclosed hereinbelow for the preparation of new steroid compounds as well as known, pharmacologically valuable steroids of the pregnane and androstane series including 1. 6-unsubstituted-10β-higher alkyl analogs of the pregnane series such as described in U.S. Pat. No. 3,309,387.
2. 6-spiroalkane derivatives (i.e. 6,6-cyclicpolymethylene derivatives) of steroids of the pregnane series such as described in Netherlands Application Nos. 66/03861 and 66/03864, in British Pat. No. 1,066,729, and in South African Patent No. 66/1036.

Of these, by way of example, the 6,6-ethyleneprogesterones (i.e. 6-spirocyclopropane-progesterones) as exemplified by 6,6-ethylene-17α-acetoxyprogesterone (prepared via the novel compounds and processes of this invention as described in Examples 2 and 11) are described in British published Patent No. 1,066,729 as possessing progestational activity via the oral and parenteral route and having a high degree of progestational activity via the parenteral route, and 3. in preparing 4,5-seco-3,5-dione analogs of the pregnane series some of which are known useful compounds, such as 4,5-seco-19-nor-pregnene-3,5,20-trione desdcribed in U.S. Pat. No. 3,155,660 as a useful intermediate in the preparation of 19-nor-9-dehydroprogesterone.

The value of the 3'-keto-2'3'-seco-1'(2')-ynes of my invention as intermediates, is based upon my discovery that my novel 4,5-seco-5-keto-3-ynes may be readily ring closed to form normal 3-keto-Δ-steroid compounds via either a direct, one-step, method by the action of mercuric acetate and sulfuric acid in acetic acid as solvent at reflux temperature for about 2 hours; or, alternatively via a two step procedure wherein a 5-keto-4,5-seco-3-yne of the general formula I above upon treatment at room temperature for about an hour with mercuric oxide and trifluoroacetic acid in aqueous dioxane as solvent is converted to another class of 4,5-seco compounds (some species of which are known in the art), i.e. the 3,5-diketo-4,5-seco steroids which, upon treatment with potassium tert.-butoxide in butanol, at reflux temperature for about three hours, are ring closed to a steroid of normal configuration. Both of these ring closure processes wherein my novel compounds are the requisite starting compounds, are illustrated diagramatically below via flow diagram, A being the remaining portion of a steroid molecule of the androstane and pregnane series:

pregnane-3,5-dione
6,6-Pentamethylene-17α,20-isopropylidenedioxy-4,5-seco-3-pregnan-3,5-dione and
6,6-Dimethyl-17α,20;20,21-bis-methylenedioxy-4,5-seco-3-pregnane-3,5-dione and the 11-keto derivative thereof.

In the second step of Ring Closure Process B, each of the foregoing compounds in turn upon treatment with potassium tert.-butoxide in tert.-butanol is ring closed to form the following 3-keto-Δ⁴-steroids, respectively 6,6-dimethyl-17α,20-propylidenedioxy-4-pregnene-3-one (which upon hydrolysis in acetic acid is converted to the 17α,20-diol which, in turn, upon oxidation with dicyclodihexylcarbodiimide pyridinium trifluoroacetate yields 6,6-dimethyl-17α-hydroxyprogesterone), 6,6-Pentamethylene-17α,20-isopropylidenedioxy-4-pregnene-3-one which upon hydrolysis in acetic acid is converted to the 20,21-diol which, in turn, is oxidized at C-20 to yield 6,6-pentamethylene-17α-hydroxyprogesterone (6-spirocyclohexane-17α-hydroxyprogesterone)

and 6,6-Dimethyl-17α,20;20,21-bis-methylenedioxy-4-pregene-3-one and the 11-keto derivative thereof (each of which upon hydrolysis in aqueous acetic acid followed by re-esterification with acetic anhydride in pyridine yields 6,6-dimethyl-4-pregnene-17α,21-diol-3,20-dione and 6,6-dimethyl cortisone.

Similarly, in Examples 8-14 are described the preparation of 10β-n-propyl-4,5-seco-3-yne-5-ones and 6,6-ethylene-4,5-seco-3-yne-5-ones (i.e. 6-spirocyclopropane-4,5-seco-3-yne-5-ones) of my invention and the conversion of my 4,5-seco-3-ynes to the therapeutically valuable 10β-n-propyl- and 6,6-ethylene-steroids of the androstane, estrane, and pregnane series disclosed and claimed in the aforementioned patents.

Ring Closure Process A:

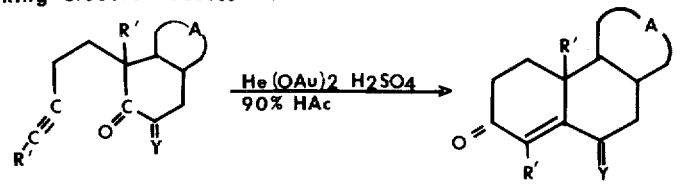

Ring Closure Process B:

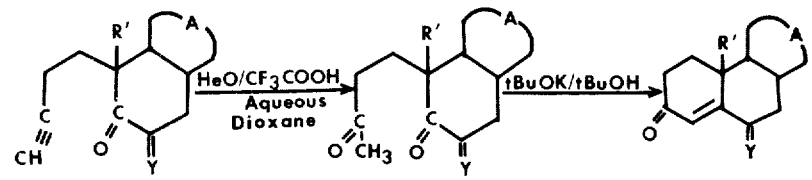

Examples 3 (B-E) and 4 (B-E), 6 (C-F) and 7 (B-D) of this application illustrate ring closure Procedure B. In these examples, each of the following compounds of my invention: 6,6-Dimethyl-17α,20-isopropylidenedioxy-4,5-seco-3-pregnyn-5-one, 6,6-Pentamethylene-17α,20-isopropylidenedioxy-4,5-seco-3-pregnyn-5-one, 6,6-Dimethyl-17α,20;20,21-bis-methylenedioxy-4,5-seco-3-pregnyn-5-one and the 11-keto-derivative thereof, upon reaction with mercuric oxide and trifluoroacetic acid in aqueous dioxane are converted to the corresponding
3,5-diketo-4,5-seco-derivative, respectively, i.e. :
6,6-dimethyl-17α,20-isopropylidenedioxy-4,5-seco-3-

General Description of the Process Aspects of this Invention First Process Aspect The invention sought to be patented in its broadest process aspect is based upon my discovery that when there is introduced into a 1'-keto-2',3'-dehydro steroid (i.e. a steroid possessing an α,β-unsaturated keto system) having a tertiary carbon at the 3'-position, both a hydrazone derivative and preferably a hydrocarbonsulfonylhydrazone derivative of the 1'-keto and an epoxy function across the 2',3'-double bond, the 1'-hydrazone-2',3'-epoxy steroidal derivative thereby formed undergoes fission between C-2' and C-3' with concomitant fragmentation and rearrangement in situ in the reaction mixture, either immediately, or upon standing at room temperatures, or upon heating at moderate temperatures in the range of from about 35°C to about 75°C, to form a novel class of compounds, i.e. the 3'-keto-2',3'-seco-1'(2')-yne steroids of the composition of matter aspect of this invention. I have discovered, further, that this reaction is of a general nature, and that formation of a 1'-hydrocarbonsulfonylhydrazone-2',3'-epoxy derivative of any 1'-keto-2',3'-dehydro system present in the steroid molecule, e.g. such as the 3-keto-$\Delta^1$-, 3-keto-$\Delta^4$-, 7-keto-$\Delta^5$-, 12-keto-$\Delta^{9(11)}$- 6-keto-$\Delta^7$-, and 16-keto-$\Delta^{14}$ moieties will result in fission between C-2' and C-3' and the formation of a 3'-keto-2',3'-seco-1'(2')-yne steroid, provided the carbon at C-3' is tertiary.

Thus, (with reference to Chart A) when each of 1α,17α-dimethyl testosterone (i.e. $\Delta^1$-3-keto) 3-acetoxy-3,5-cholestadiene-7-one (i.e. $\Delta^5$-7-keto), 3β-acetoxy-5β-hydroxy-7,22-lumis-tadiene-6-one (i.e. $\Delta^7$-6-keto), 9(11)-dehydrohecogenin-3-acetate (i.e. $\Delta^{9(11)}$-12-keto), 3β-acetoxy-14-androstene-16-one (i.e. $\Delta^{14}$-16-keto), and testosterone ($\Delta^4$-3-keto) are converted to the corresponding hydrazono-epoxy derivatives, e.g. 3-p-toluene-sulfonylhydrazono-1,2-oxido-1α,17α-dimethyl-androstan-17β-ol, 3-acetoxy-5,6-oxido-7-p-toluenesulfonylhydrazono-3-cholestene, 3β-acetoxy-5β-hydroxy-6-p-toluenesulfonylhydrazono-7,8-oxido-22-lumistene, 9,11-oxido-hecogenin 3-acetate 12-p-toluenesulfonylhydrazone, 14,15-oxido-16-p-toluenesulfonylhydrazono-androstane and 3-p-toluenesulfonylhydrazono-4,5-oxido-androstan-17β-ol, fission and rearrangement of each of the foregoing derivatives occurs and there are formed seco-steroid compounds of my invention, e.g.

1,17α-dimethyl-1,2-seco-3-androstyn-17β-ol-1-one
3-acetoxy-5,6-seco-3-dehydro-7-cholestyn-5-one
3β-acetoxy-5β-hydroxy-7,8-seco-22-dehydro-6-lumistyn-8-one,
9,11-seco-22α,25a-11-spirostyn-3β-ol-9-one 3-acetate
3β-acetoxy-14,15-seco-16-androstyn-14-one and
4,5-seco-3-androstyn-17β-ol-5-one, respectively.

The preferred mode of carrying out my process is that wherein a 3-keto-$\Delta^4$ is utilized as starting compound (e.g. testosterone) and there is prepared a 4,5-seco-5-keto-3-yne steroid of this invention (e.g. 4,-5-seco-3-androstyn-17β-ol-5-one).

Discussed in detail below is the manner of carrying out the physical embodiments of the preferred species of the process aspect of this invention, it being understood that, in similar manner, any α,β-unsaturated keto steroid can be reacted by my process to form a 3'-keto-2',3'-seco-1'(2')-yne steroid of this invention.

In carrying out my process, known techniques for preparing the epoxy and hydrazone derivatives are used. It is immaterial, furthermore, whether the epoxy function or hydrazone derivative is introduced first into the molecule, although I have found it more convenient to first prepare the epoxy derivative, or to use a known α-epoxy-β-keto steroid as a starting compound.

Thus, to prepare 4,5-seco-3-androstyn-17β-ol-5-one (compound I', R = $CH_3$) or to prepare 4,5-seco-3-estryn-17β-ol-5-one (compound I', R is hydrogen) by my process, one can utilize either one of the sequences of reactions shown in below Chart B, i. (1) by first treating testosterone (or 19-nor-testosterone) with a known epoxidizing reagent (such as alkaline hydrogen peroxide) followed by treatment of the thereby formed 4,5-oxido-androstan-17β-ol-3-one (or 4,5-oxido-estran-17β-ol-3-one) with a hydrocarbonsulfonylhydrazine (preferably p-toluenesulfonylhydrazine) in a lower alkanol according to standard procedures for making hydrazone derivatives of ketones or (2) alternatively, by first reacting testosterone (or 19-nor-testosterone) with p-toluenesulfonylhydrazine in ethanol followed by treatment of the thereby formed 3-p-toluenesulfonylhydrazono-4-androsten-17β-ol (or, when R is H, 3-p-toluenesulfonylhydrazono-4-estren-17β-ol) with an epoxidizing reagent, e.g. a per-acid such as m-chlorperbenzoic acid in methylene chloride. The steric configuration of the epoxy group at C-4, 5 is immaterial to my process. Both the 4α,5α-oxido- and the 4β,5β-oxido intermediates 2ab undergo fission and rearrangement to form the 4,5-seco-5-keto-3-ynes of formula I'.

In both procedures (1) and (2) shown below in Chart B, the reaction mixtures in which intermediary products 2 ab (and thence seco steroids I') are being formed are stirred at room temperature for relatively long periods of time, i.e. 9 hours in procedure (1) and 17 hours in procedure (2). When carrying out my process for the first time on an α,β-unsaturated steroid, it is desirable to take aliquots of the reaction mixture at intervals to determine via thin layer chromatographic and spectral data the progress of the reaction as evidenced by the amount of starting products (1a) or (1b) remaining in the reaction mixture.

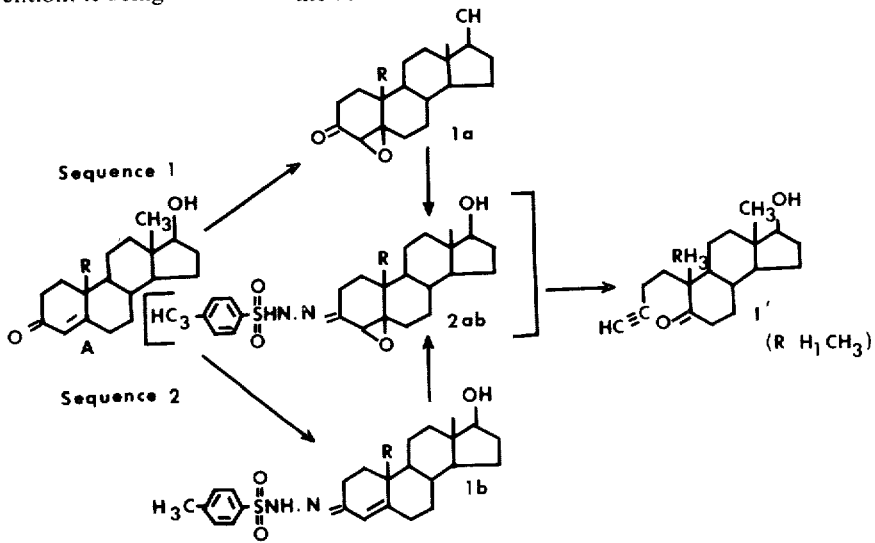

Chart B

The products (I) formed by my process, i.e. 4,5-seco-3-androstyn-17β-ol-5-one (when R is CH₃) and 4,5-seco-3-estryn-17β-ol-5-one (when R is H), via either of the above sequence of reactions, are conveniently isolated by treatment with water followed by extraction into an organic solvent. These products can be purified utilizing any of several techniques known in the art including, in particular, column and thin layer chromatography.

In carrying out the basic steps of my process as described in above procedures (1) and (2) (Chart B) whereby testosterone (compound A wherein R is CH₃) is converted to 3,4-seco-3-androstyn-17β-ol-5-one (compound I, R is methyl) there are used techniques similar to those known in the art. Thus, to prepare the hydrocarbonsulfonylhydrazone derivatives, e.g. product 1b, a steroid having a keto moiety is usually dissolved in a lower alkanol to which is added at least a molar equivalent of a hydrazine and usually a hydrocarbonsulfonylhydrazine, preferably p-toluenesulfonylhydrazine and methanesulfonylhydrazine. Other sulfonylhydrazines may also be employed, such as ethanesulfonylhydrazine, benzenesulfonylhydrazine, napthalene-β-sulfonylhydrazine, ortho-toluenesulfonylhydrazine, meta-toluenesulfonylhydrazine, and, 3,4-xylenesulfonylhydrazine.

Similarly, the epoxy function is introduced utilizing techniques known in the art as those utilizing alkaline tertiary alkyl hydroperoxides, such as t-butyl hydroperoxide, t-cumyl hydroperoxide, or by utilizing a per acid such as perbenzoic, perphthalic, m-chloroperbenzoic acid, and the like, in an inert solvent.

I have found it desirable when carrying out my process to utilize a per acid (e.g. perbenzoic acid) in an inert solvent, (e.g. methylene chloride) when introducing the epoxy function after the hydrazone derivative has been made; whereas alkaline hydrogen peroxide is my choice of epoxidizing reagent when introducing the epoxy group prior to the hydrazone derivative.

It is usually preferable to carry out my process under an atmosphere of an inert gas, such as argon or nitrogen. Second Process Aspect whereby groups are introduced on carbons vicinal the 3-carbon of the starting 1-keto-2,3-dehydro steroid which, in the case of the preferred species of this invention relates to the introduction of groups at C-6 and/or C-10.

Described above is a preferred mode of the basic first process aspect of my invention whereby a 3-keto-4-dehydro-steroid (e.g. testosterone and 19-nor-testosterone) upon epoxidation across the Δ⁴-bond and preparation of the p-toluenesulfonylhydrazone derivative of the 3-keto, is converted to form a 5-keto-4,5-seco-3-yne, product I, of my invention (e.g. 4,5-seco-3-androstyn-17β-ol-5-one and 4,5-seco-3-estryn-17β-ol-5-one, respectively).

In a second process aspect of my invention, 4,5-seco-3-yne-5-ones (prepared by the above described first process aspect), are further reacted in an alkylating medium, (such as those utilizing sodium hydride in tetrahydrofuran, butyl lithium in ethylene glycol dimethyl ether, or an alkali metal alkoxide in alkanol, e.g. potassium tert. butoxide in butanol or sodium methoxide in benzene, with a hydrocarbon sulfonate or, preferably, hydrocarbon halide, including alkyl halides, aralkyl halides, alkenyl halides, e.g. methyl iodide, whereby (depending upon the quantity of reagent and the reaction conditions employed, in particular, temperature and length of reaction) any replaceable hydrogens on C-6 and/or C-b 10 are substituted by the hydrocarbon radical of said hydrocarbon halide (e.g. methyl) and there may be formed, for example, 6-methyl, 6,6-dimethyl, 10-methyl, 6,10-dimethyl or 6,6,10-trimethyl analogs of the starting 4,5-seco-3-yne-5-ones.

In carrying out the alkylating reactions of the second process aspect of my invention, it is preferable to protect any groups which might enter into a reaction with the reagents being employed. Thus, prior to subjecting the seco steroids to an alkylating agent according to this second process aspect of my invention, any secondary hydroxy groups present, such as at C-17, are protected either by esterification thereof or by preparation of the tetrahydropyranyl ether function.

Pregnane compounds having a cortical side chain at C-17 are desirably converted to a 17α,20;20,21-bis-methylendioxy function, or to 17,21-acetonide derivatives. Similarly, in 17α-hydroxyprogesterone compounds, the 20-keto group is desirably reduced to the corresponding 20-carbinol and the 17α,20-diol thereby formed converted to the corresponding 17,20-acetonide prior to alkylation of a 6 and/or 10-unsubstituted-4,5-seco-5-keto-3-yne to a 6- and/or 10-hydrocarbon substituted 4,5-seco-5-keto-3-yne of my invention.

The second process aspect of my invention is based upon my discovery that, by utilizing alkylating techniques, hydrocarbon substituents may be introduced into the 6 and/or 10 positions of my novel 4,5-seco-5-keto-3-yne steroidal derivatives and that the C-10 tertiary hydrogen (when present) will alkylate prior to the secondary hydrogens at C-6. Furthermore, introduction of the second hydrocarbon group at C-6 usually requires forcing conditions (i.e. excess reagent, higher temperatures and longer reaction time). Thus, by varying the conditions under which the physical embodiment of the second process aspect is carried out, there may be obtained a 10-mono-, 6-mono-, 6,10-di-, or a 6,6,10-trisubstituted 4,5-seco-6-keto-3-yne of my invention.

Since, by my process, the carbon at C-10 undergoes alkylation prior to the carbon at C-6, the 10-alkyl- and 10-alkylene derivatives having up to 12 carbon atoms are conveniently prepared by the alkylation process aspect of my invention by reaction of a 19-nor-4,5-seco of formula I, i.e. 4,5-seco-3-estryn-17β-ol-5-one (after protection of the 17-hydroxyl group by preparation of an ester or tetrahydropyranyl ether thereof) with a molar equivalent of an alkyl halide, e.g. propyl iodide, in the presence of an alkylating medium, e.g. sodium hydride in tetrahydrofuran, under mild conditions, e.g. at room temperature for about 16 hours followed by a short period (1.5 hours) at about 60°C, whereby 10-n-propyl-4,5-seco-3-androstyn-17β-ol-5-one is formed.

When starting with a 6-and 10-unsubstituted 4,5-seco-5-keto-3-yne of my invention, e.g. 4,5-seco-3-estryn-17β-ol-5-one, by using an excess of a hydrocarbon halide, together with heat and longer reaction times, there can be made 6,10-di-and 6,6,10-trisubstituted compounds. For example, 4,5-seco-3-estryn-17β-ol-5-one 17-tetrahydropyranyl ether in refluxing tetrahydrofuran in the presence of at least molar equivalents of sodium hydride to which has been added a large molar excess of 2-propenyl bromide will, after 17.5 hours be converted to 6,10-di-(2'-propenyl)-4,5-seco-3-androstyn-17β-ol-5-one 17-tetrahydropyranyl ether, whereas additional halide reagent, i.e. 2-propenyl bromide, is required plus a longer period of heating time, e.g. 72 hours at reflux temperature, in order to introduce the third 2'-propenyl group to obtain 6,6,10-tri-(2'-propenyl)-4,5-seco-3-androstyn-17β-ol-5-one 17-tetrahydropyranyl ether.

By combining varying alkylating reagents and techniques, there can be obtained derivatives having different substituents at C-6 and C-10. Thus, 4,5-seco-3-estryn-17β-ol-5-one (wherein the 17-hydroxy is protected by a 17-tetrahydropyranyl structure) upon treatment with sodium ethoxide in benzene and ethylformate at low temperatures is converted to 6-formyl-4,5-seco-3-estryn-17β-ol which, in turn, upon treatment in benzene with n-butylthiol in the presence of p-toluenesulfonic acid at reflux temperatures for short periods of time (e.g. 1-3 hours) will form the enol-thiol ether derivative of the 6-formyl group to produce 6-n-butylthiomethylene-4,5-seco-3-estryn-17β-ol-5-one (Example 25B). Further treatment of the foregoing 4,5-seco steroid in a strongly basic alkylating medium (e.g. potassium tert.-butoxide in tert. butanol with an excess of dodecyl iodide under forcing conditions, i.e. at reflux temperature for 36 hours) according to the second process aspect of this invention is converted to 6-n-butylthiomethylene-10-dodecyl-3-androstyn-17β-ol novel steroidal derivatives of my invention.

In the foregoing procedure, the method of 6-formylation followed by enolization at C-6 via butylthiol, provides a means of introducing a novel substituent at C-6 prior to alkylation at C-10 in a 19-nor steroid to produce a 10-higher alkyl analog of the 4,5-seco-5-keto-3-ynes of my invention.

When utilizing methyl iodide as the alkylating hydrocarbon halide reagent, and an excess of reagent is used with respect to the molar quantity of starting steroid, all available hydrogens at C-6 and C-10 will alkylate with ease. Thus, 4,5-seco-3-pregnyn-17α,20-diol-5-one 17,20-acetonide, 4,5-seco-3-pregnyn-17α,21-diol-5,20-dione 17,20;20,21-bis-methylene dioxide and the 11-keto derivatives thereof in an alkylating medium such as sodium hydride in tetrahydrofuran upon treatment with an excess of methyl iodide at 50°C for about 10–15 hours are each converted to the corresponding 6,6-dimethyl analogs, i.e. 6,6-dimethyl-4,5-seco-3-pregnyne-17α,20-diol-5-one 17,20-acetonide, 6,6-dimethyl-4,5-seco-3-pregnyne-17α,21-diol-5,20-dione 17,20; 20,21-bis-methylenedioxide and the 11-keto derivative thereof. When the acetonide and bis-methylenedioxy protective groups in the side chain at C-17 of the foregoing 4,5-seco- pregnanes of my invention are hydrolyzed in an acidic medium such as acetic acid, there is obtained respectively, 6,6-dimethyl-4,5-seco-3-pregnyn-17α-20-diol-5-one (which, upon oxidation with dicyclohexyldicarbodiimide dimethyl sulfoxide is converted to the corresponding 20-keto analog), 6,6-dimethyl-4,5-seco-3-pregnyn-17α,21-diol-5,20-dione and 6,6-dimethyl-4,5-seco-3-pregnyne-17α,2(-diol-5,11,20-trione. The second process aspect of my invention provides a convenient means for introducing a spirocycloalkane derivative at C-6 into my novel 4,5-seco-5-keto-3-ynes. Thus, reaction of each of 4,5-Seco-3-pregnyn-17α,20-diol-5-one 17,20-acetonide, and 4,5-Seco-3-pregnyne-17α,21-diol-5,11,20-trione 17,20;20, 21-bis-methylenedioxide with sodium hydride in tetrahydrofuran followed by pentamethylene dibromide for about 16 hours at 70°C will yield, respectively, 6,6-Pentamethylene-4,5-seco-3-pregnyne-17α,20-diol-5-one 17,20-acetonide and 6,6-Pentamethylene-4,5-seco-3-pregnyne-17α,21-diol-5,11,20-trione 17α,20;20,21-bis-methylene dioxide.

Third Process Aspect

By means of a third process aspect of my invention, the 5-hydroxy-4,5-seco-3-ynes of my invention are derived from the corresponding 5-ones, in turn, prepared as described in the first two process aspects of my invention. The third process aspect of my invention comprises treating a 4,5-seco-5-one, e.g. 17α,20;20,21-bis-methylenedioxy-4,5-seco-3-pregnyn-5-one, with a reducing agent which will not effect the alkinyl group at C-3; including alkali metal borohydrides such as lithium borohydride, potassium borohydride and, preferably, sodium borohydride in methanol, and the 5-keto is reduced to a 5-hydroxy function and there is formed 17α,20;20,21-bis-methylenedioxy-4,5-seco-3pregnyn-5-ol.

Any reactive keto substituents present in the molecule are preferably protected prior to reduction with sodium borohydride by preparing functional derivatives thereof, such as dialkyl ketals, cyclic alkylene ketals, enol ethers and enol esters or, when they are present in the C-20 pregnane cortical side chain by preparing acetonide derivatives, e.g. 17α,21-acetonides or 17-α,20;20,21-bis-methylenedioxy derivatives.

The 5-hydroxy derivatives of my invention can be esterified utilizing known techniques, e.g. by lower alkanoic acid anhydride in pyridine or a hydrocarbon carboxylic acid halide, e.g. benzoyl chloride or a sulfonic acid chloride in pyridine. Thus 17α,20;20,21-bis-methylenedioxy-4,5-seco-3-pregnyn-5-ol upon treatment with either acetic anhydride or p-toluenesulfonyl chloride will yield the corresponding 5-ester, i.e. the 5-acetate and 5-p-toluenesulfonate, respectively.

In general, when carrying out any of the process aspects it is preferable to introduce into the normal steroid molecule prior to fission and rearrangement by the first process aspect of this invention, any protective groups which will be needed in any of the three process aspects of this invention. When the 4,5-seco-5-keto-3-yne steroidal derivatives thus prepared are to be utilized as intermediates for preparing pharmacologically valuable steroids as discussed hereinabove, the protective groups are conveniently retained until after ring closure of my seco compounds to a normal steroid structure. Alternatively, when the seco compounds are to be used per se, the protective groups, e.g. esters, ethers, acetonides, and bismethylene dioxy functions, can be removed after any one of the processes of this invention.

The above is a description of my inventive concept and of physical embodiments thereof exemplifying the manner of making and using my invention. It is to be understood that my invention is not to be construed as limited to the above disclosed but as also encompassing equivalents thereof obvious to one skilled in the art of the class of chemistry to which this invention pertains.

EXAMPLE 1

17α,20-Isopropylidenedioxy-4-pregnen-3-one

A. 4-Pregnene-17α,20-diol-3-one

To a stirred slurry of 2.5 g. of lithium aluminum hydride in 150 ml. of tetrahydrofuran and 150 ml. of ether, add dropwise over 0.5 hour a solution of 5 g. of 17α-hydroxyprogesterone in 50 ml. of tetrahydrofuran. Stir the reaction mixture for 16 hours at room temperature under a nitrogen atmosphere. Decompose the excess lithium aluminum hydride by the dropwise addition of a saturated aqueous sodium sulfate solution, then add 25 g. of sodium sulfate and filter the solution, washing the filter cake with 100 ml. of tetrahydrofuran.

Evaporate the combined filtrate and wash the solution in vacuo to a residue (5 g.) $\lambda_{max}^{Nujol}$ 2.9 μ (—OH).

Purify as follows: to 1 g. of residue in 300 ml. of chloroform add 3 g. of activated magnesium dioxide and stir at room temperature for 40 hours. Filter through Celite and evaporate the solvent in vacuo to a residue (0.9 g.). Crystallize the residue from ethyl acetate to give 4-pregnene-17α,20-diol-3-one (0.5 g.). $\lambda_{max}^{Nujol}$ 2.9 (—OH) 6.0 (C=O) and 6.15 (C=C).

B. 17α,20-Isopropylidenedioxy-4-pregnen-3-one

To a stirred solution of 10 g. of 4-pregnene-17α,20-diol-3-one in 800 ml. of acetone under a nitrogen atmosphere add 400 g. of anhydrous copper sulfate. Vigorously stir the reaction mixture at reflux temperature for 20 hours, then cool to room temperature. Filter and wash the filter cake with 200 ml. of acetone. Evaporate the combined filtrate and wash acetone in vacuo to a residue (11 g.). Thin layer chromatography on an Si-GF plate utilizing as solvent system chloroform-ethyl acetate indicates that all the starting compound has been converted to 17α,20-isopropylidenedioxy-4-pregnen-3-one. Prepare an analytical sample by crystallization from acetone, m.p. 178°-181°C [α] D + 45° (CHCl₃); $\lambda_{max}^{Nujol}$ 6.0 (C=O) and 6.2 μ (C=C).

EXAMPLE 2

4,5-Seco-3-pregnyn-17α-ol-5,20-dione
Procedure 1: (2A-2D)
A. 4,5-Oxido-17α,20-isopropylidenedioxy-pregnan-3-one To a stirred solution of 5 g. of 17α,20-isopropylidenedioxy-4-pregnen-3-one in 350 ml. of methanol cooled to 0°C, add dropwise simultaneously 3 ml. of a 10 percent sodium hydroxide solution and 9 ml. of 30 percent hydrogen peroxide. Regulate the rate of addition so that the reaction temperature does not exceed 3°C and so that the addition of both solutions is completed at the same time. Stir the reaction mixture for 48 hours at 0°C, then pour into 3 liters of ice-saturated sodium chloride solution. Extract with three 1 liter portions of chloroform, then wash the combined chloroform extracts with a 5 percent aqueous sodium bicarbonate solution, then with water. Dry over sodium sulfate and evaporate the chloroform in vacuo to a residue. Dissolve the residue in benzene and chromatograph on 175 g. of silica gel-G eluting with benzene-2.5 percent ether. Evaporate the combined benzene ether eluates to a residue (3.3 g.) comprising 4,5-oxido-17α,20-isopropylidenedioxy-pregnan-3-one. Prepare an analytical sample by sublimation at 70°C and 10⁻¹ mm, m.p. 73°-79° [α]ᴅ 48 (CHCl₃) $\lambda_{max}^{Nujol}$ 5.85 μ (C=O).

B. 17α,20-Isopropylidenedioxy-4,5-seco-3-pregnyn-5-one

To a stirred solution of 3.2 g. of 4β,5β-oxido-17α,20-isopropylidenedioxy-pregnan-3-one in 180 ml. of methanol, add 1.58 g. of p-toluenesulfonyl hydrazine. Stir the mixture at 60°C for 15 minutes and then at room temperature for 2 hours. Pour into 1 liter of an ice-saturated sodium chloride solution and extract with three 300 ml. portions of chloroform. Wash the combined chloroform extracts with a 5 percent aqueous sodium bicarbonate solution, then with water and dry over sodium sulfate. Remove the solvent in vacuo and dissolve the resultant residue in benzene and chromatograph on 110 g. of silica gel-G eluting with benzene-2.5 percent ether. Evaporate the combined eluates to a residue (2.2 g.) comprising 17α,20-isopropylidenedioxy-4,5-seco-3-pregnyn-5-one. Prepare an analytical sample by crystallization from methylene chloride-hexane, m.p. 110°-112°C [α]ᴅ 24 (CHCl₃) $\lambda_{max}^{Nujol}$ 3.0, 4.7 (C ≡ C-H) and 5.85 μ (C= O). -seco-and for making C. 4,5-Seco-3-pregnyne-17α,20-diol-5-one To a solution of 0.5 g. of 17α,20-isopropylidenedioxy-4,5-seco-3-pregnyn-5-one in 30 ml. of glacial acetic acid, add 30 ml. of water. Heat the reaction mixture on a steam bath under an atmosphere of nitrogen for three hours, then cool to room temperature. Distill the water and acetic acid in vacuo and dissolve the resultant residue in benzene and chromatograph the benzene solution on 18 g. of silica gel-G eluting with benzene-ether. Evaporate the combined eluates to a residue (0.3 g.) comprising 4,5-seco-3-pregnyne-17α,20-diol-5-one. $\lambda_{max}^{Nujol}$ 2.9 (—OH) 3.0 and 4.7 (C ≡ C-H) 6.0 (C=O) and 6.2 μ (C=C). This product is homogeneous by thin layer chromatographic analyses (Si-GF, CHCl₃-EtOAc).

D. 4,5-Seco-3-pregnyn-17α-ol-5,20-dione

To a stirred solution of 0.3 g. of 4,5-seco-3-pregnyne-17α,20-diol-5-one in 30 ml. of acetone, add dropwise chromium trioxide in acetone until a permanent yellow color appears. Filter the reaction mixture through Celite and wash the filter cake with 10 ml. of acetone, then add 75 ml. of chloroform to the filtrate. Wash the chloroform solution with water and dry over sodium sulfate. Evaporate the chloroform in vacuo to a residue (0.250 g.) comprising a mixture of 4,5-seco-3-pregnyn-17α-ol-5,20-dione together with 4,5-seco-3-androstyne-5,20-dione as determined by thin layer chromatographic analysis of Si-GF utilizing a chloroform-ethyl acetate solvent system. Purify by crystallization from ether to obtain 0.04 g. of 4,5-seco-3-pregnyn-17α-ol-5,20-dione. Prepare an analytical sample by recrystallization from methanol; m.p. 185°-188°C $\lambda_{max}^{Nujol}$ 2.9 (-OH), 3.0 and 4.7 (C ≡ C-H) and 5.85, 5.90 μ (C=O).

An additional amount of the product of this example is obtained by applying the ether filtrate from the above crystallization to an 8 × 8 inch × 1 mm Si-GF thin layer chromatographic plate and developing the plate with a benzene-ether solvent system. Elute separately the two products thereby isolated to obtain 35 mg. of 4,5-seco-3-pregnyn-17α-ol-5,20-dione (product 2D) and 68 mg. of 4,5-seco-3-androstyne-5,17-dione.

Procedure 2:

E. 4,5-Epoxy-17α-hydroxy-pregnan-3,20-dione

To a stirred solution of 5 g. of 17α-hydroxyprogesterone in 800 ml. of methanol cooled to 0°C under an atmosphere of nitrogen, add dropwise simultaneously 7 ml. of 10 percent aqueous sodium hydroxide and 22 ml. of 30 percent aqueous hydrogen peroxide at such a rate that the additions are completed at the same time and the temperature of the reaction mixture does not rise above 0°C. Stir the reaction mixture for 48 hours at 5°C, then pour into 4 l. of saturated aqueous sodium chloride and ice, then extract the mixture with 5 one-liter portions of chloroform. Wash the combined chloroform extracts with 5 percent aqueous sodium bicarbonate the hydrochloric acid and finally water. Dry the chloroform solution over sodium sulfate then evaporate the chloroform in vacuo to a residue (3.5 g.). Chromatograph on silica gel-G eluting with benzene - 10 percent ether in benzene. Evaporate the combined eluates to a residue comprising 4,5-epxoy-17α-hydroxy-pregnan-3,20-dione $\lambda_{max}^{Nujol}$ 2.8 (—OH) and 5.85 (C=O). The product is used without further purification in procedure 2F.

F. 17α-Hydroxy-4,5-seco-3-pregnyne-5,20-dione

To a stirred solution of 1 g. (3nM.) of 4,5-epoxy-17αhydroxy-pregnan-3,20-dione in 200 ml. of ethanol, add 0.56 g. (3nM.) of p-toluenesulfonyl hydrazine. Stir the reaction mixture at room temperature for 2 hours then pour into 1 l. of saturated aqueous sodium chloride and ice. Extract 3 times with 500 ml. portions chloroform, then wash the combined chloroform extracts with a 5 percent aqueous sodium bicarbonate solution, 2N hydrochloric solution then water. Dry over sodium sulfate and distill the chloroform in vacuo. Chromatograph the resultant residue on silica gel-G eluting with benzene - 5 percent ether in benzene. Evaporate the combined eluates to a residue (0.76 g.) comprising 17-α-hydroxy-4,5-seco-3-pregnyne-5,20-dione.

Prepare an analytical sample by crystallization from methanol; m.p. 185°–188°; $\lambda_{max}^{Nujol}$ 2.9 (—OH), 3.0 and 4.7 (C ≡ CH) and 5.85 (C=O).

EXAMPLE 3

Conversion of 17α,20-isopropylidenedioxy-4,5-seco-3-pregnyn-5-one to 6,6-dimethyl-17α-hydroxyprogesterone A. 6,6-Dimethyl-17α,20-isopropylidenedioxy-4,5-seco-3-pregnyn-5-one To a stirred solution of 1.8 g. of sodium hydride in 30 ml. of tetrahydrofuran under a nitrogen atmosphere, add dropwise a solution of 2 g. of 17α,20-isopropylidenedioxy-4,5-seco-3-pregnyn-5-one in 30 ml. of tetrahydrofuran. Keep the reaction mixture for 2 hours at room temperautre, add dropwise 12 ml. of methyl iodide, allow the reaction mixture to stand for 16 hours at room temperature, then decompose any excess sodium hydride with water. Add an additional 150 ml. of water then 150 ml. of ether and separate the organic layer from the aqueous layer. Wash the ethereal solution with water then dry over sodium sulfate and evaporate the ether in vacuo to a residue comprising 6,6-dimethyl-17α,20-isopropylidenedioxy-4,5-seco-3-pregnyn-5-one. Purify by chromatography on Florisil eluting with benzene-ether (50:1). Evaporate the combined eluates to a residue comprising: 6,6-dimethyl-17α,20-isopropylidenedioxy-4,5-seco-3-pregnyn-5-one; $\lambda_{max}^{film}$ 3.0 and 4.7 (C ≡ C-H); 5.9 μ (C=O). nmr 6.02 (quartet, J = 6 cps, $C_{20}$-H); 8.60 ($I_\rho$-$CH_3$); 8.69 (doublet, J = 6 cps, $C_{21}$-$CH_3$); 8.74 ($I_\rho$-$CH_3$); 8.87 '($C_6$-$CH_3$); 8.94 ($C_{19}$-$CH_3$); 8.98 ($C_6$-$CH_3$); 9.13 τ($C_{18}$-$CH_3$). This product is used in the following reaction 29B without further purification.

B. 6,6-Dimethyl-17α,20-isopropylidenedioxy-4,5-seco-pregnane-3,5-dione

To a slurry of 60 mg. red mercuric oxide in 10 ml. dioxane add 0.1 ml. trifluoroacetic acid followed by a solution of 600 mg. 6,6-dimethyl-17α,20-isopropylidenedioxy-4,5-seco-3-pregnyne-5-one in 16 ml. of dioxane and 4 ml. of water. Stir the reaction mixture for 5.5 hours at room temperature, then pour into 200 ml. cold water, extract the resultant white suspension with three 50 ml. portions of chloroform. Wash the combined chloroform extracts with water, dry over sodium sulfate and evaporate in vacuo to a residue comprising 6,6-dimethyl-17α,20-isopropylidenedioxy-4,5-seco-pregnene-3,5-dione. This product is homogeneous as determined by thin layer chromatographic analysis on Si-GF utilizing as solvent system benzene-ether (1:1) $\lambda_{max}^{film}$

5.9 μ (C=O). nmr 6.02 (quartet, J = 6 cps, $C_{20}$-H); 7.93

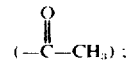

8.63 (doublet, J = 6 cps, $C_{21}$-$CH_3$); 8.74 ($I_\rho$-$CH_3$); 8.88 ($C_6$-$CH_3$); 8.92 ($C_{19}$-$CH_3$); 8.98 ($C_6$-$CH_3$); 9.31 τ ($C_{18}$-$CH_3$). This product is used in the subsequent reaction of Example 29C without further purification.

C. 6,6-Dimethyl-17α,20-isopropylidenedioxy-4-pregnen-3-one

To a solution of 40 mg. of 6,6-dimethyl-17α,20-isopropylidenedioxy-4,5-seco-pregnane-3,5-dione in 12 ml. of dry t-butanol add 50 mg. of potassium t-butoxide. Stir the mixture at 50°C for 16 hours, then pour into 100 ml. of water, acidify the aqueous solution with 3 percent hydrochloric acid and extract with chloroform. Wash the combined chloroform extracts with water, dry over sodium sulfate and distill the chloroform in vacuo to a residue comprising 6,6-dimethyl-17α,20-isopropylidenedioxy-4-pregnen-3-one. Purify by crystallization from acetone; m.p. 200°–203°C $\lambda_{max}^{Nujol}$ 6.0 (C=O); 6.25 (C=C). nmr 4.22 ($C_4$-H); 6.04 (quartet, J = 6 cps, $C_{20}$-H); 8.64 ($I_\rho$-$CH_3$); 8.72 (doublet, J = 6 cps, $C_{21}$-$CH_3$); 8.74 ($I_\rho$-$CH_3$ and $C_{19}$-$CH_3$); 8.87 ($C_6$-$CH_3$); 8.90 ($C_6$-$CH_3$); 9.32 τ ($C_{18}$-$CH_3$).

D. 6,6-Dimethyl-4-pregnene-17α,20-diol-3-one

Heat at reflux temperature for 5 hours a solution of 500 mg. of 6,6-dimethyl-17α,20-isopropylidenedioxy-4-pregnen-3-one in 50 ml. 80 percent aqueous acetic acid. Pour the reaction mixture into ice water and extract with chloroform. Wash the combined chloroform extracts with aqueous sodium bicarbonate solution, then water and dry over sodium sulfate. Evaporate in vacuo to a residue (417 mg.) comprising 6,6-dimethyl-4pregnene-17α,20-diol-3-one. $\lambda_{max}^{Nujol}$ 2.85 (OH); 6.03 (C=O); 6.25 μ (C=C). nmr 4.06 ($C_4$-H); 6.0 (multiplet, $C_{20}$-H); 8.70 ($C_{19}$-$CH_3$); 8.81 and 8.82 (doublet, J = 6 cps, two different $C_{21}$-$CH_3$'s); 8.82 ($C_6$-$CH_3$); 8.87 ($C_6$-$CH_3$); 9.13 and 9.20 τ (two different $C_{18}$-$CH_3$'s). This product was a mixture of isomers at $C_{20}$. This product is used without further purification in the procedure of Example 3E immediately following.

E. 6,6-Dimethyl-17α-hydroxyprogesterone

To a solution of 680 mg. of 6,6-dimethyl-17α,20-diol-4-pregnen-3-one in 15 ml. of dry dimethylsulfoxide and 15 ml. dry benzene, add 1.16 g. of dicyclohexylcarbodiimide and 182 mg. pyridinium trifluoroacetate. Stir under an atmosphere of nitrogen at 70°C for 24 hours. Add 30 ml. of ethyl acetate and remove the resultant precipitate by filtration. Extract the filtrate with aqueous sodium bicarbonate solution, 3 percent hydrochloric acid, then water and dry over sodium sulfate. Evaporate the solvents in vacuo and chromatograph the resultant residue on 75 g. Florisil eluting first with benzene-ether (9:1) and then with benzene-ether (3:1). Evaporate the 3:1 benzene-ether eluates to a residue (254 mg.) comprising 6,6-dimethyl-17α-hydroxyprogesterone. Prepare an analytical sample by repeated crystallization from methylene chloride-hexane $\lambda_{max}$ $\lambda_{max}^{Nujol}$ 2.9 (OH); 5.85 (CH$_3$-C=O); 6.0 (C=O); 6.25 $\mu$ (-C=C-). nmr 4.05 (C$_4$-H); 7.74 (C$_{21}$-CH$_3$); 8.72 (C$_{19}$-CH$_3$); 8.83 (C$_6$-CH$_3$); 8.87 (C$_6$-CH$_3$); 9.24 $\tau$ (C$_{18}$-CH$_3$).

EXAMPLE 4

Conversion of 17α,20-isopropylidenedioxy-4,5-seco-3-pregnyn-5-one to 6,6-pentamethylene-17α-hydroxyprogesterone A. 6,6-Pentamenthylene-17α,20-isopropylidenedioxy-4,5-seco-3-pregnyn-5-one To a stirred slurry of 0.43 g. of sodium hydride in 30 ml. of dry tetrahydrofuran under an atmosphere of nitrogen, add dropwise over a period of 10 minutes a solution of 2.2 g. of 17α,20-isopropylidenedioxy-4,5-seco-3-pregnyn-5-one in tetrahydrofuran. Heat the reaction mixture at reflux temperature for two hours, then cool to room temperature and add dropwise over a period of 10 minutes a solution of 1.38 g. of 1,5-dibromopentane in tetrahydrofuran. Heat the reaction mixture for 16 hours at 70°C, cool to room temperature, then decompose the excess sodium hydride by the dropwise addition of water, then add 100 ml. of water followed by 100 ml. of ether. Wash the ethereal solution with water, dry over sodium sulfate, then remove the solvents in vacuo to obtain a residue comprising 6,6-pentamethylene-17α,20-isopropylidenedioxy-4,5-seco-3-pregnyn-5-one. Purify by chromatography on silica gel eluting with benzene-ether (100:1); $\lambda_{max}^{Nujol}$ 3.0 and 4.7 (C ≡ C-H); 5.9 $\mu$ (C=O). nmr 6.06 (quartet, J = 6 cps, C$_{20}$-H); 8.6 (-(CH$_2$)$_5$); 8.64 (I$_p$-CH$_3$); 8.73 (doublet, J = 6 cps, C$_{21}$-CH$_3$); 8.76 (I$_p$-CH$_3$); 9.01 (C$_{19}$-CH$_3$); 9.32 $\tau$ (C$_{18}$-CH$_3$). This compound is used without further purification in the procedure of Example 4B immediately following.

B. 6,6-Pentamethylene-17α,20-isopropylidenedioxy-4,5-seco-pregnane-3,5-dione

In a manner similar to that described in Example 3B, treat 6,6-pentamethylene-17α,20-isopropylidenedioxy-4,5-seco-3-pregnyn-5-one in 90 percent dioxane with mercuric oxide and trifluoroacetic acid. Isolate the product thereby formed in a manner similar to that described to obtain 6,6-pentamethylene-17α,20-isopropylidenedioxy-4,5-seco-pregnane-3,5-dione; $\lambda_{max}^{Nujol}$ 5.93 (CH$_3$-C=O); 5.97 $\mu$ (C=O). This compound is used without further purification in the procedure of Example 4C immediately following.

C. 6,6-Pentamethylene-17α,20-isopropylidenedioxy-4-pregnen-3-one

To a solution of 150 mg. of 6,6-pentamethylene-17α,20-isopropylidenedioxy-pregnane-3,5-dione in 15 ml. of t-butanol, add 50 mg. of potassium tertiary butoxide. Stir the reaction mixture at room temperature for 1.5 hours, at reflux temperature for 6 hours, at 40°C for an additional 17 hours and then cool to room temperature. Add the reaction mixture to 50 ml. of water, neutralize with 2N hydrochloric acid and extract three times with 25 ml. portions of chloroform. Wash the combined chloroform extracts with water, dry over sodium sulfate and distill the chloroform in vacuo to a residue comprising 6,6-pentamethylene-17α,20-isopropylidenedioxy-4-pregnen-3-one which is a homogeneous product by thin layer chromatographic analysis on Si-GF plate utilizing as solvent system benzene-ether (1:1). $\lambda_{max}^{film}$ 5.96 (C=O); 6.25 $\mu$ (C=C). This product is used without further purification in the procedure of Example 4D immediately following.

D. 6,6-Pentamethylene-4-pregnene-17α,20-diol-3-one

In a manner similar to that described in Example 3D reflux an acetic acid solution of 6,6-pentamethylene-17α,20-isopropylidenedioxy-4-pregnen-3-one for 5 hours. Isolate the resultant product in a manner similar to that described to obtain 6,6-pentamethylene-4-pregnene-17α,20-diol-3-one. This compound is used without further purification in the procedure of Example 4E immediately following.

E. 6,6-Pentamethylene-17α-hydroxyprogesterone

In a manner similar to that described in Example 3E, treat 6,6-pentamethylene-4-pregnene-17α,20-diol-3-one with dimethylsulfoxide, dicyclohexylcarbodiimide and pyridinium trifluoro acetate. Isolate the resultant product in a manner similar to that described in 3E to obtain 6,6-pentamethylene-17α-hydroxyprogesterone.

EXAMPLE 5

4,5-Seco-3-pregnyne-17α,21-diol-5,20-dione 21-acetate

A. 4,5-Oxido-17α,20;20,21-bis-methylenedioxy-pregnan-3-one

To a stirred solution of 5 g. 17α,20;20,21-bis-methylenedioxy-4-pregnen-3-one cooled to 0°C, add dropwise 20 ml. of a 10 percent aqueous sodium hydroxide solution and 62.5 ml. of 30 percent hydrogen peroxide. Add these solutions simultaneously at rates such that the addition of both solutions will be completed at the same time and so that the reaction temperature will not exceed 3°C. Stir the reaction mixture at 0°C for 148 hours and then pour into 4 liters of ice-saturated sodium chloride solution and extract with three 1 liter portions of chloroform. Wash the combined chloroform extracts with 5 percent aqueous sodium bicarbonate solution, 2N hydrochloric acid solutions, then water and dry over sodium sulfate. Distill the chloroform in vacuo and chromatograph the resultant residue dissolved in benzene on 150 g. of Merck acid washed alumina eluting with benzene. Distill the combined eluates to a residue (3.18 g.) comprising 4,5-oxido-17α-20;20,21-bis-methylenedioxy-pregnan-3-one. Prepare an analytical sample by crystallization from ether, m.p. 167°–172°C $[\alpha]_D$ - 6 (CHCl$_3$), $\lambda_{max}^{Nujol}$ 5.85 $\mu$ (C=O), 9.2 and 10.6 $\mu$ (BMD).

B. 17α,20;20,21-Bis-methylenedioxy-4,5-seco-3-pregnyn-5-one

To a solution of 0.56 g. of 4β, 5β-oxido-17α,20;20,21-bis-methylenedioxy-pregnan-3-one in 100 ml. of methanol, add 0.260 g. of p-toluenesulfonyl hydrazine. Heat the reaction mixture for 15 minutes at 60°C, then stir at room temperature for 20 hours. Pour the reaction mixture into 500 ml. of an ice-saturated sodium chloride solution and extract with three 150 ml. portions of chloroform. Wash the combined chloroform extracts with a 5 percent aqueous sodium bicarbonate solution, 2N hydrochloric acid solution, then water and dry over sodium sulfate. Distill the chloroform in vacuo and dissolve the resultant residue in benzene and chromatograph on 20 g. of Merck acid washed alumina eluting with benzene-ether. Evaporate the combined benzene-ether eluates to a residue (0.370 g.) comprising 17α,20;20,21-bis-methylenedioxy-4,5-seco-3-pregnyn-5-one. Prepare an analytical sample by recrystallization from methylene chloride-hexane, m.p. 101°–102°C $[\alpha]_D$ 75 (CHCl$_3$), $\lambda_{max}^{Nujol}$ 3.0 and 4.7 (C ≡ C-H); 5.8 (C=O), and 9.2 and 10.6 μ (BMD). nmr 4.9 and 5.14 (BMD-4H), 6.1 (C$_{21}$-2H) 8.93 (C$_{19}$-3H) and 9.13 τ (C$_{18}$-3H)

C. 4,5-Seco-3-pregnyne-17α,21-diol-5,20-dione 21-acetate

To a solution of 2.5 g. of 17α,20;20,21-bis-methylenedioxy-4,5-seco-3-pregnyn-5-one in 150 ml. of glacial acetic acid under an atmosphere of nitrogen, add 100 ml. of water. Heat the reaction mixture on a steam bath for 7 hours, then distill the aqueous acetic acid in vacuo. Dissolve the resultant residue in 50 ml. of pyridine and add 50 ml. of acetic anhydride. Allow the reaction mixture to stand at room temperature under an atmosphere of nitrogen for 16 hours. Distill the pyridine and acetic anhydride in vacuo and dissolve the resultant residue in benzene and chromatograph on 75 g. of silica gel-G eluting with ether-25 percent benzene, ether, and chloroform. Evaporate the combined eluates to a residue (0.7 g.) comprising 4,5-seco-3-pregnyne-17α,21-diol-5,20-dione 21-acetate. Prepare an analytical sample by crystallization from ether; m.p. 128°–130°C. λ$_{max}$ $^{Nujol}$ 2.85 (-OH), 5.73, 5.78, and 59.3 (C=O), and 8.0 μ

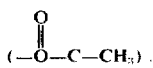

EXAMPLE 6

Preparation of 17α,20;20,21-bis-methylenedioxy-4,5-seco-3-pregnyne-5,11-dione and conversion thereof to 6,6-dimethyl-4-pregnene-17α,21-diol-3,11,20-trione A. 4,5-Oxido-17α,20;20,21-bis-methylenedioxy-pregnane-3,11-dione To a stirred solution of 8 g. of 17α,20;20,21-bis-methylenedioxy-4-pregnene-3,11-dione in 300 ml. of dioxane cooled to 0°C, add 16 ml. 30 percent hydrogen peroxide and 30 ml. 1N sodium hydroxide. Stir the reaction mixture for 24 hours at room temperature, then pour into 1500 ml. of ice water, filter the resultant precipitate, wash with water and crystallize from methylene chloride-ether to obtain 4,5-oxido-17α,20;20,21-bis-methylenedioxy-pregnane-3,11-dione (4.32 g.); m.p. 291–295°C. λ$_{max}$ $^{Nujol}$ 5.85 (C=O), 9.2, 10.6 μ (BMD). nmr 4.81, 4.93, 5.00 (BMD-4H), 6.04 (C$_{21}$-2H), 6.98 (C$_4$-H), 8.73 (C$_{18}$-3H), 9.17(C$_{19}$-3H).

B. 17α,20;20,21-Bis-methylenedioxy-4,5-seco-3-pregnyne-5,11-dione

Dissolve 4.32 g. of 4,5-oxido-17α,20;20,21-bis-methylenedioxy-pregnane-3,11-dione in 1 liter n-propyl alcohol and add 2.14 g. p-toluenesulfonyl hydrazine. Stir the reaction mixture at room temperature for 22 hours then concentrate in vacuo to a residue. Chromatograph the residue on 200 g. alumina eluting with benzene-10 percent ether and benzene-20 percent ether. Evaporate the combined eluates to a residue (2.43 g.) comprising 17α,20;20,21-bis-methylenedioxy-4,5-seco-3-pregnyne-5,11-dione. Prepare an analytical sample by recrystallizing from methanol; m.p. 149.5°–150.5°C λ$_{max}$ $^{Nujol}$ 3.0, 4.70 (C ≡ C-H) 5.85 μ (C=O). nmr 4.80, 4.92, 5.00 (BMD-4H) 6.03 (C$_{21}$-2H), 8.70 (C$_{18}$-3H), 9.17 (C$_{19}$-3H).

C. 6,6-Dimethyl- 17α,20;20,21-bis-methylenedioxy-4,5-seco-3-pregnyne-5,11-dione

Add 1 g. 17α,20;20,21-bis-methylenedioxy-4,5-seco-3-pregnyne-5,11-dione to a slurry of 2.1 g. of a 55 percent sodium hydride suspension in mineral oil and 150 ml. tetrahydrofuran. Stir the mixture at 25°C for 8 hours, then add 3 ml. methyl iodide and stir the reaction mixture for an additional 9 hours. Add dropwise 5 ml. of water to decompose any excess sodium hydride followed by an additional 300 ml. of water. Separate the tetrahydrofuran layer and extract the water layer with 100 ml. of ether. Wash the combined organic extracts with water, dry over sodium sulfate and evaporate in vacuo to a residue. Chromatograph the residue on 90 g. of alumina eluting with benzene-5 percent ether. Evaporate the combined eluates to a residue (150 mg.) comprising 6,6-dimethyl-17α,20;20,21-bis-methylenedioxy-4,5-seco-3-pregnyne-5,11-dione. Prepare an analytical sample by recrystallization from ether; m.p. 173°–175°C. λ$_{max}$ $^{Nujol}$ 3.0, 4.7 μ (C ≡ C-H), 5.90 μ (C=O). nmr 4.75, 4.85-5.0, (BMD-4H), 6.03 (C$_{21}$-2H), 8.71, 8.89 (C$_6$-2×3H), 9.13 τ (C$_{19}$-3H).

D. 6,6-Dimethyl-17α,20;20,21-bis-methylenedioxy-4,5-seco-pregnane-3,5,11-trione

To a slurry of 5 mg. mercuric oxide in 1 ml. of dioxane, 0.1 ml. water and 0.1 ml. trifluoroacetic acid, add 50 mg. of 6,6-dimethyl-17α,20;20,21-bis-methylenedioxy-4,5-seco-3-pregnyne-3,5-dione in 1 ml. dioxane and 0.1 ml. distilled water. Stir the reaction mixture under nitrogen at 25°C for 2 hours, then pour into 50 ml. ice water and extract with methylene chloride. Wash the combined methylene chloride extracts with saturated aqueous sodium chloride then dry over sodium sulfate and evaporate in vacuo to a residue (45 mg.) comprising 6,6-dimethyl-17α,20;20,21-bis-methylenedioxy-4,5-seco-pregnane-3,5,11-trione. IR: λ$_{max}$ $^{Nujol}$ 5.85 μ (C=O). nmr 4.83, 4.9-5.0 (BMD-4H), τ6.03 (C$_{21}$-2H), 7.93 (C-3H), 8.68, 8.80 C$_6$-2×3H), 8.90 (C$_{18}$-3H), 9.10 (C$_{19}$-3H).

E. 6,6-Dimethyl-17α,20;20,21-bis-methylenedioxy-4-pregnene-3,11-dione

In a manner similar to that described in Example 3C, treat 6,6-dimethyl-17α20;20,21-bis-methylenedioxy-4,5-seco-pregnane-3,5,11-trione with potassium tertiary butoxide in t-butanol and isolate the resultant product to obtain 6,6-dimethyl-17α,20;20,21-bis-methylenedioxy-4-pregnene-3,11-dione.

F. 6,6-Dimethyl-4-pregnene-17α,21-diol-3,11,20-trione (6,6-dimethyl cortisone)

In a manner similar to that described in Example 5C, treat 6,6-dimethyl-17α,20;20,21-bis-methylenedioxy-4-pregnene-3,11-dione with 60 percent acetic acid followed by treatment of the product thereby formed with acetic anhydride in pyridine to obtain 6,6-dimethyl-4-pregnene-17α,21-diol-3,11,20-trione 21-acetate (6,6-dimethyl cortisone acetate).

EXAMPLE 7

6,6-Dimethyl-4-pregnene-17α,21-diol-3,20-dione A. 6,6-Dimethyl-17α,20;20, 21-bis-methylenedioxy-3-pregnyn-5-one In a manner similar to that described in Example 6C, treat 17α,20;20,21-bis-methylenedioxy-4,5-seco-3-pregnyn-5-one (compound of Example 5B) with sodium hydride in tetrahydrofuran followed by methyl iodide. Isolate and purify the resultant product in a manner similar to that described to obtain 6,6-dimethyl-17α,20;20,21-bis-methylenedioxy-3-pregnyn-5-one.

B. 6,6-Dimethyl-17α,20;20,21-bis-methylenedioxy-4,5-seco-pregnane-3,5-dione

23

In a manner similar to that described in Example 6D, treat 6,6-dimethyl-17α,20;20,21-bis-methylenedioxy-3-pregnyn-5-one with mercuric oxide in trifluoroacetic acid in aqueous dioxane. Isolate and purify the resultant product in a manner similar to that described to obtain 6,6-dimethyl-17α,20;20,2120;20,21-bis-methylene-dioxy-4,5-seco-pregnane-3,5-dione.

C. 6,6-Dimethyl-17α,20;20,21-bis-methylenedioxy-4-pregnen-3-one

In a manner similar to that described in Example 6E, treat 6,6-dimethyl-17α,20;20,21-bis-methylenedioxy-4,5-seco-pregnane-3,5dione with potassium tertiary butoxide in t-butanol. Isolate and purify the resultant product in a manner similar to that described to obtain 6,6-dimethyl-17α,20;20,21-bis-methylenedioxy-4-pregnene-3-one.

D. 6,6-Dimethyl-4-pregnene-17α,21-diol-3,20-dione 21-acetate

In a manner similar to that described in Example 5C, treat 6,6-dimethyl-17α,20;20,21-bis-methylenedioxy-4-pregnene-3-one with 60 percent acetic acid followed by treatment of the product thereby formed with acetic anhydride in pyridine. Isolate and purify the resultant product in a manner similar to that described to obtain 6,6-dimethyl-4-pregnene-17α,21-diol-3,20-dione 21-acetate.

EXAMPLE 8

10β-n-Propyl-17α,20;20,21-bismethylenedioxy-4,5-seco-19-nor-3-pregnyn-11β-ol-5-one 11-acetate and conversion thereof to 10β-n-propyl-19-nor-4-pregnene-11β,17α,21-triol-3,20-dione 21-acetate A. 17α,20;20,21-bismethylenedioxy-19-nor-4-pregnen-11β-ol-3-one 11-acetate Prepare the 17α,20;20,21-bismethylenedioxy derivative of 19-nor-hydrocortisone according to know procedures by treating 19-nor-cortisone in chloroform with 37 percent formaldehyde and hydrochloric acid.

To a solution of 1.0 g. of 17α,20;20,21-bis-methylenedioxy-19-nor-4-pregnen-11β-ol-3-one in 10 ml. of pyridine, add 1 ml. of acetic anhydride and leave at room temperature for 16 hours. Evaporate in vacuo to a small volume, then dissolve the residue in 100 ml. of ether. Wash the ether solution with water, dry over sodium sulfate and remove the ether in vacuo to a residue comprising 17α,20;20,21-bismethylenedioxy-19-nor-4-pregnen-11β-ol-3-one 11-acetate.

B. 4,5-Oxido-17α,20;20,21-bismethylenedioxy-19-nor-pregnan-11β-ol-3-one 11-acetate In a manner similar to that described in Example 6A, treat 17α,20;20,21-bismethylenedioxy-19-nor-4-pregnen-11β-ol-3-one 11-acetate with aqueous hydrogen peroxide and sodium hydroxide and isolate and purify the resultant product to obtain 4,5-oxido-17β,20;20,21-bismethylenedioxy-19-nor-pregnan-11β-ol-3-one 11-acetate.

C. 17β,20;20,21-bismethylenedioxy-4,5-seco-19-nor-3-pregnyn-11β-ol-5-one 11-acetate In a manner similar to that described in Example 6B, treat 4,5-oxido-17α,20;20,21-bismethylenedioxy-19-nor-pregnan-11β-ol-3-one 11-acetate in n-propyl alcohol with p-toluenesulfonyl-hydrazine. Isolate and purify the resultant product in a manner similar to that described to obtain 17α,20;20,21-bismethylenedioxy-4,5-seco-19-nor-3-pregnyn-11β-ol-5-one 11-acetate. D. 1-0β-n-Propyl-17α,20;20,21-bismethylenedioxy-4,5-seco-19-nor-3-pregnyn-11β-ol-5-one 11-acetate

24

To a slurry of 3 g. of 62.4% sodium hydride (in mineral oil) in 30 ml. dry tetrahydrofuran add in one portion a solution of 1.54 g. 17α,20;20,21-bismethylenedioxy-4,5-seco-19-nor-3-pregnyn-11β-ol-5-one 11-acetate in 45 ml. dry tetrahydrofuran. Stir the reaction mixture at room temperature under a nitrogen atmosphere for 1.5 hours, then add 0.42 ml. n-propyl iodide. Stir the reaction mixture at room temperature for 16 hours, then heat at reflux temperature for 1.5 hours. Decompose the excess sodium hydride by adding 25 ml. of water, then dilute the reaction mixture with 150 ml. of ether, separate the layers and wash the organic layer with water. Dry the organic solution over sodium sulfate, then remove the solvent in vacuo, chromatograph the resultant residue on 200 g. of Florisil eluting with 5 percent ether. Evaporate the ether from the combined eluates to a residue comprising 10β-n-propyl-17α,20;20,21-bis-methylenedioxy-4,5-seco-19-nor-3-pregnyn-11β-ol- 5-one 11-acetate.

E. 10β-n-Propyl-17α,20;20,21-bismethylenedioxy-4,5-seco-19-nor-pregnan-11β-ol-3,5-dione 11-acetate In a manner similar to that described in Example 6D, treat 10β-n-propyl-17α,20;20,21-bismethylenedioxy-4,5-seco-19-nor3-pregnyn-11β-ol-5-one 11-acetate in dioxane with mercuric oxide in aqueous trifluoroacetic acid. Isolate and purify the resultant product in a manner similar to that described to obtain 10β-n-propyl-17α,20;20,21-bismethylenedioxy-4,5-seco-19-nor-pregnan-11β-ol-3,5-dione 11-acetate.

F. 10β-n-Propyl-17α,20;20,21-bismethylenedioxy-19-nor-4-pregnen-11β-ol-3-one 11-acetate In a manner similar to that described in Example 3C, treat 10β-n-propyl-17α,20;20,21-bismethylenedioxy-4,5-seco-19-nor-pregnan-11β-ol-3,5-dione 11-acetate with potassium tertiary butoxide in t-butanol and isolate the resultant product to obtain 10β-n-propyl-17α,20;20,21-bismethylenedioxy-19-nor-4-pregnen-11β-ol-3-one 11-acetate.

G. 10β-n-Propyl-17α,20;20,21-bismethylenedioxy-19-nor-4-pregnen-11β-ol-3-one

Hydrolyze the 11acetate ester microbiologically according to know procedures utilizing Flavo Bacterium dehydrogenans var. hydrolithicum (SCH.-1111) as follows: Prepare a culture of Flavo Bacterium dehydrogenans in a 1 percent Difco yeast buffered solution (10 g. of Difco yeast, 4.68 g. of disodium hydrogen phosphate, 4.48 g. of potassium dihydrogen phosphate) with shaking and illumination for 20 hours. To the culture add 0.5 g. of 10β-n-propyl-17α,20;20,21-bismethylenedioxy-19-nor-4-pregnen-11β-ol-3-one 11-acetate in 20 ml. of methanol and proceed with shaking and illumination until chromatographic analysis of an aliquot of the fermentation medium indicates deacetylation is complete. Then adjust the pH of the broth to 4.0, heat the solution to 90°C for 30 minutes with stirring, filter with the addition of filter-seal and extract the filtrate with chloroform. Extract the firmentation broth exhaustively with chloroform, dry the combined chloroform extracts over anhydrous sodium sulfate, filter and evaporate the chloroform in vacuo to a residue comprising 10β-n-propyl-17α20;20,21-bismethylenedioxy-19-nor-4-pregnen-11β-ol-3-one. After slight purification by trituration with hexane, this product is used without further purification in procedure 8H immediately following.

H. 10β-n-propyl-19-nor-4-pregnen-11β,17α,21-triol-3,20-dione 21-acetate (i.e. 10β-n-propyl-19-nor-hydrocortisone 21-acetate)

In a manner similar to that described in Example 5C, heat 10β-n-propyl-17α,20;20,21-bismethylenedioxy-19-nor-4-pregnen-11β-ol-3-one in aqueous acetic acid under an atmosphere of nitrogen for 7 hours, followed by treatment of the product thereby formed with acetic anhydride in pyridine to obtain 10β-n-propyl-19-nor-hydrocortisone 21-acetate.

In a similar manner, 19-nor-4-pregnene-17α,21-diol-3,20-dione may be subjected to a series of transformations similar to those described in procedures 8B through F and H to obtain 10β-n-propyl-19-nor-4-pregnene-17α,21-diol-3,20-dione 21-acetate.

EXAMPLE 9

10β-n-Propyl-17α,20-isopropylidenedioxy-4,5-seco-19-nor-3-pregnyn-5-one and conversion thereof to 10-β-n-propyl-17α-hydroxy-19-nor-progesterone A. 19-Nor-4-pregnen-17α,20-diol-3-one In a manner similar to that described in Example 1A treat 17α-Hydroxy-19-nor-progesterone with lithium aluminum in tetrahydrofuran-ether and isolate the resultant product in a manner similar to that described, and purify by treatment with magnesium dioxide in chloroform to obtain 19-nor-4-pregnen-17α,20-diol-3-one.

B. 17α,20-Isopropylidenedioxy-19-nor-4-pregnen-3-one

In a manner similar to that described in Example 1B treat 19-nor-4-pregnen-17α,20-diol-3-one with anhydrous copper sulfate in acetone and isolate and purify the resultant product to obtain 17α,20-isopropylidenedioxy-19-nor-4-pregnen-3-one.

C. 4,5-Oxido-17α,20-isopropylidenedioxy-19-nor-pregnan-3-one

In a manner similar to that described in Example 2A treat 17α,20-isopropylidenedioxy-19-nor-4-pregnen-3-one with 30 percent hydrogen peroxide and 10 percent sodium hydroxide and isolate and purify the resultant product to obtain 4,5-oxido-17α,20-isopropylidenedioxy-19-nor-pregnan-3-one.

D. 17α,20-Isopropylidenedioxy-4,5-seco-19-nor-3-pregnyn-5-one

In a manner similar to that described in Example 2B treat 4,5-oxido-17α,20-isopropylidenedioxy-19-nor-pregnan-3-one with p-toluenesulfonylhydrazine in methanol. Isolate and purify the resultant product in a manner similar to that described to obtain 17α,20-isopropylidenedioxy-4,5-seco-19-nor-3-pregnyn-5-one.

E. 10β-n-Propyl-17α,20-isopropylidenedioxy-4,5-seco-3-pregnyn-5-one

In a manner similar to that described in Example 8D treat 17α,20-isopropylidenedioxy-4,5-seco-19-nor-3-pregnyn-5-one with sodium hydride in tetrahydrofuran under an atmosphere of nitrogen followed by n-propyl iodide. Stir the reaction mixture at room temperature for 16 hours and isolate and purify the resultant product in a manner similar to that described to obtain 10β-n-propyl-17α,20-isopropylidenedioxy-4,5-seco-19-nor-3-pregnyn-5-one.

F. 10β-n-Propyl-17α,20-isopropylidenedioxy-4,5-seco-19-nor-pregnane-3,5-dione

In a manner similar to that described in Example 6D treat 10β-n-propyl-17α,20-isopropylidenedioxy-4,5-seco-19-nor-3-pregnyn-5-one in dioxane with mercuric oxide and aqueous trifluoroacetic acid. Isolate the resultant product in a manner similar to that described to obtain 10β-n-propyl-17α,20-isopropylidenedioxy-4,5-seco-19-nor-pregnane-3,5-dione.

G. 10β-n-Propyl-17α,20-isopropylidenedioxy-19-nor-4-pregnen-3-one

In a manner similar to that described in Example 3C, treat 10β-n-propyl-17α,20-isopropylidenedioxy-4,5-seco-19-nor-pregnane-3,5-dione with potassium tertiary butoxide in t-butanol and isolate the resultant product to obtain 10β-n-propyl-17α,20-isopropylidenedioxy-19-nor-4-pregnen-3-one.

H. 10β-n-Propyl-19-nor-4-pregnene-17α,20-diol-3-one

In a manner similar to that described in Example 3D, treat 10β-n-propyl-17α,20-isopropylidenedioxy-19-nor-4-pregnen-3-one with 80 percent aqueous acetic acid at reflux temperature for 5 hours. Isolate the resultant product in a manner similar to that described to obtain 10α-n-propyl-19-nor-4-pregnene-17α,20-diol-3-one.

I. 10β-n-Propyl-17α-hydroxy-19-nor-progesterone (i.e. 10α-n-propyl-17α-hydroxy-19-nor-4-pregnene-3,20-dione)

In a manner similar to that described in Example 3E, treat 10β-n-propyl-19-nor-4-pregnene-17α,20-diol-3-one in dimethylsulfoxide and benzene with dicyclohexylcarbodiimide and pyridinium trifluoro acetate. Isolate the resultant product in a manner similar to that described to obtain 10β-n-propyl-17α-hydroxy-19-nor-progesterone.

EXAMPLE 10

6,6-Ethylene-17α,20;20,21-bismethylenedioxy-4,5-seco-3-pregnyn-5-one and conversion thereof to 6,6-ethylene-4-pregnene-17α,21-diol-3,20-dione (i.e. 6,1-spirocyclopropyl-4-pregnene-17α,21-diol-3,20-dione)

A. 6,6-Ethylene-17α,20;20,21-bismethylenedioxy-4,5-seco-3-pregnyn-5-one

Add 38.9 g. (0.1 mole) of 17α,20;20,21-bismethylenedioxy-4,5-seco-3-pregnyn-5-one (compound of Example 5D) to a refluxing suspension of 11.7 g. (0.3 moles) of sodium amide in 150 ml. of liquid ammonia, and stir the mixture for one hour. Add over a 30 minute period 56.4 g. (0.3 moles) of 1,2-dibromoethane and stir for an additional four hours, then stop the reaction by adding 16.1 g. of ammonium chloride. Allow the ammonia to evaporate, then add methylene chloride to the residue. Wash the methylene chloride solution with water, with 20 percent aqueous ammonium chloride and finally with water. Dry the chloroform solution over anhydrous magnesium sulfate and evaporate in vacuo to a residue comprising 6,6-ethylene-17α-20;20,21-bismethylenedioxy-4,5-seco-3-pregnyn-5-one.

In similar manner treat 17α,20;20,21-bismethylenedioxy-4,5-seco-3-pregnyne-5,11-dione (the compound of Example 6B) with sodium amide in liquid ammonia and 1,2-dibromoethane and isolate the resultant product to obtain 6,6-ethylene-17α,20;20,21-bismethylenedioxy-4,5-seco-3-pregnyne-5,11-dione.

B. 6,6-Ethylene-17α,20;20,21-bismethylenedioxy-4,5-seco-pregnane-3,5-dione

In a manner similar to that described in Example 6D, treat 6,6-ethylene-17α,20;20,21-bismethylenedioxy-4,5-seco-3-pregnyn-5-one in aqueous dioxane with mercuric oxide and aqueous trifluoroacetic acid and isolate the resultant product to obtain 6,6-ethylene- 17α,20;20,21-bismethylenedioxy-4,5-seco-pregnane-3,5-dione.

C.  6,6-Ethylene-17α,20;20,21-bismethylenedioxy-4-pregnen-3-one

In a manner similar to that described in Example 6E, treat 6,6-ethylene-17α,20;20,21-bismethylenedioxy-4,5-seco-3-pregnyne-3,5-dione with potassium tertiary butoxide in t-butanol and isolate the resultant product to obtain 6,6-ethylene-17α,20;20,21-bismethylenedioxy-4-pregnen-3-one.

D.  6,6-Ethylene-4-pregnene-17α,21-diol-3,20-dione 21-acetate

In a manner similar to that described in Example 6F, treat 6,6-ethylene-17α,20;20,21-bismethylenedioxy-4-pregnen-3-one with 60 percent acetic acid followed by treatment of the product thereby formed with acetic anhydride in pyridine to obtain 6,6-ethylene-4-pregnene-17α,21-diol-3,20-dione 21-acetate.

By going through the sequence of reactions set forth in Examples 10B, C and D, 6,6-ethylene-17α,20;20,21-bismethylenedioxy-4,5-seco-3-pregnyn-5-one (prepared as in Example 10A) is converted to 6,6-ethylenecortisone 21-acetate (i.e. 6,6-ethylene-4-pregnene-17α,21-diol-3,11,20-trione 21-acetate.

EXAMPLE 11

6,6-Ethylene-17α,20-isopropylidenedioxy-4,5-seco-3-pregnyn-5-one and conversion thereof to 6,6-ethylene-17α-hydroxyprogesterone A.  6,6-Ethylene-17α,20-isopropylidenedioxy-3-pregnyn-5-one In a manner similar to that described in Example 10A, treat 17α,20-isopropylidenedioxy-4,5-seco-3-pregnyn-5-one (compound of Example 2B) with sodium amide in liquid ammonia followed by 1,2-dibromoethane and isolate the resultant product to obtain 6,6-ethylene-17α,20-isopropylidenedioxy-3-pregnyn-5-one.

B.  6,6-Ethylene-17α,20-isopropylidenedioxy-4,5-seco-pregnane-3,5-dione

In a manner similar to that described in Example 6D, treat 6,6-ethylene-17α,20-isopropylidenedioxy-4,5-seco-3-pregnyn-5-one in aqueous dioxane with mercuric oxide in aqueous trifluoroacetic acid. Isolate the resultant product to obtain 6,6-ethylene-17α,20-isopropylidenedioxy-4,5-seco-pregnane-3,5-dione.

C.  6,6-Ethylene-17α,20-isopropylidenedioxy-4-pregnen-3-one

In a manner similar to that described in Example 6E, treat 6,6-ethylene-17α,20-isopropylidenedioxy-4,5-seco-pregnane-3,5-dione with potassium tertiary butoxide in t-butanol. Isolate the resultant product to obtain 6,6-ethylene-17α,20-isopropylidenedioxy-4-pregnen-3-one.

D. 6,6-Ethylene-17α-hydroxyprogesterone

In a manner similar to that described in Example 3D, treat 6,6-ethylene-17α,20-isopropylidenedioxy-4-pregnen-3-one with 80 percent aqueous acetic acid and isolate the resultant product comprising 6,6-ethylene-4-pregnene-17α,20-diol-3-one. Treat the foregoing diol with dimethyl sulfoxide, dicyclohexylcarbodiimide and pyridinium trifluoro acetate in the manner described in Example 3E. Isolate the resultant product to obtain 6,-6-ethylene-17α-hydroxyprogesterone.

E. 6,6-Ethylene-17α-acetoxyprogesterone

To a solution of 1 g. of 6,6-ethylene-17α-hydroxyprogesterone in 10 ml. of acetic acid through which argon gas is being bubbled, add under anhydrous conditions 1.99 ml. of trifluoroacetic anhydride. Heat the solution at about 80°–95°C for an hour, then pour into ice water, extract with methylene chloride and wash the combined extracts with 3% aqueous potassium carbonate and then with water. Evaporate the methylene chloride solution in vacuo to a residue comprising 6,6-ethylene-17α-acetoxyprogesterone

EXAMPLE 12

6,6-Ethylene-9α-fluoro-16β-methyl-17α,20;20,21-bismethylenedioxy-4,5-seco-3-pregnyn-11β-ol-5-one and conversion thereof to 6,6-ethylene-betamethasone 21-acetate (i.e. 6,6-ethylene-9α-fluoro-16β-methyl-1,4-pregnadiene-11β,17α,21-triol-3,20-dione 21-acetate)

A.  4,5-Oxido-9α-fluoro-16β-methyl-17α,20;20,21-bismethylenedioxy-pregnan-11β-ol-3-one Prepare the 17α,20;20,21-bismethylenedioxy derivative of betamethasone according to known procedures by treating betamethasone in chloroform with 37 percent formaldehyde and hydrochloric acid.

In a manner similar to that described in Example 6A treat 9α-fluoro-16β-methyl-17α,20;20,21-bismethylenedioxy-4-pregnen-11β-ol-3-one with aqueous hydrogen peroxide and sodium hydroxide and isolate the resultant product to obtain 4,5-oxido-9α-fluoro-16β-methyl-17α,20;20,21-bismethylenedioxy-pregnan-11β-ol-3-one.

B.  9α-Fluoro-16β-methyl-17α,20;20,21-bismethylenedioxy-4,5-seco-3-pregnyn-11β-ol-5-one In a manner similar to that described in Example 6B, treat 4,5-oxido-9α-fluoro-16β-methyl-17α,20;20,21-bismethylenedioxy-pregnan-11β-ol-3-one in n-propanol with p-toluenesulfonylhydrazine. Isolate and purify the resultant product in a manner similar to that described to obtain 9α-fluoro-16β-methyl-17α,20;20,21-bismethylenedioxy-4,5-seco-3-pregnyn-11β-ol-5-one.

C.  6,6-Ethylene-9α-fluoro-16β-methyl-17α,20;20,21-bismethylenedioxy-4,5-seco-3-pregnyn-11β-ol-5-one In a manner similar to that described in Example 10A, treat 9α-fluoro-16β-methyl-17α,20;20,21-bismethylenedioxy-4,5-seco-3-pregnyn-11β-ol-5-one with sodium amide in refluxing ammonia followed by 1,2-dibromoethane. Isolate the resultant product in a manner similar to that described to obtain 6,6-ethylene-9α-fluoro-16β-methyl-17α,20;20,21-bismethylenedioxy-4,5-seco-3-pregnyn-11β-ol-5-one.

D. 6,6-Ethylene-9α-fluoro-16β-methyl-17α,20;20,21-bismethylenedioxy-4,5-seco-pregnan-11β-ol-3,5-dione In a manner similar to that described in Example 6D, treat 6,6-ethylene-9α-fluoro-16β-methyl-17α,20;20,21-bismethylenedioxy-4,5-seco-3-pregnyn-11β-ol-5-one in aqueous dioxane with mercuric oxide and aqueous trifluoroacetic acid. Isolate the resultant produce to obtain 6,6-ethylene-9α-fluoro-16β-methyl-17α,20;20,21-bismethylenedioxy-4,5-seco-pregnan-11β-ol-3,5-dione.

E.  6,6-Ethylene-9α-fluoro-16β-methyl-17α,20;20,21-bismethylenedixoy-4-pregnen-11β-ol-3-one In a manner similar to that described in Example 6E, treat 6,6-ethylene-9α-fluoro-16β-methyl-17α,20;20,21-bismethylenediioxy-4,5-sec-pregnan-11β-ol-3,5-dione with potassium tertiary butoxide in t-butanol. Isolate the resultant product in a manner similar to that described to obtain 6,6-ethylene-9α- fluoro-16β-methyl-17α,20;20,21-bismethylenedioxy-4-pregnan-11β-ol-3-one.

F. 6,6-Ethylene betamethasone 21-acetate (6,6-ethylene-9α-fluoro-16β-methyl-1,4-pregnadiene-11β,17α,21-triol-3,20-dione 21-acetate)

Subject 6,6-ethylene-9α-fluoro-16β-methyl-17α,20;20,21-bismethylenedioxy-4-pregnen-11β-ol-3-one to the action of the microorganism Corynebacterium simplex (A.T.C.C. 6946) according to known procedures such as described in U.S. Pat. No. 2,837,464 to obtain 6,6-ethylene-9α-fluoro-16β-methyl-17α,20;20,21-bismethylenedioxy-1,4-pregnadien-11β-ol-3-one.

In a manner similar to that described in Example 6F, treat the 6,6-ethylene-1,4-pregnadiene prepared in the paragraph above with aqueous acetic acid followed by treatment of the product thereby formed with acetic anhydride in pyridine to obtain 6,6-ethylene-betamethasone 21-acetate (6,6-ethylene-9α-fluoro-16β-methyl-1,4-pregnadiene-11β,17α,21-triol-3,20-dione 21-acetate).

EXAMPLE 13

21-Desoxy-4,5-seco-3-pregnynes and alkylated derivatives produced therefrom A. Treat each of the progesterone derivatives listed below in the following manner:

a. Reduce the 20-keto group to a 20-hydroxy function in a manner similar to that described in Example 8D.

b. In any 17α-hydroxy compound convert the resulting 17α,20-diol to the corresponding 17α,20-isopropylidenedioxy derivative via the procedure described in Example 1B.

c. In the 17-desoxyprogesterones esterify the resulting 20-ol via procedures such as in Example 8A.

d. In the 9-unsubstituted compounds convert any 11β-hydroxyl group present to the corresponding 11-acetate by procedures such as in Example 11E.

e. Treat the resulting derivatives prepared as outlined in steps a)-d) above with alkaline hydrogen peroxide in the manner of Example 2A followed by treatment of the 4,5-oxido compound thereby formed with p-toluenesulfonylhydrazine in the manner of Example 2B.

1. 16α-Methyl-17α-hydroxyprogesterone
2. 16β-Methyl-17α-hydroxyprogesterone
3. 11β,17α-Hydroxyprogesterone
4. 9α-Fluoro-11β,17α-dihydroxyprogesterone
5. 11β,17α-Dihydroxy-16α-methylprogesterone
6. 11β,17α-Dihydroxy-16β-methylprogesterone
7. 9α-Fluoro-11β,17α-dihydroxy-16α-methylprogesterone
8. 9α-Fluoro-17α-hydroxy-16β-methylprogesterone
9. 16α-Methylprogesterone
10. 16β-Methylprogesterone
11. 11β-Hydroxyprogesterone
12. 9α-Fluoro-11β-hydroxyprogesterone
13. 11β-Hydroxy-16α-methylprogesterone
14. 11β-Hydroxy-16β-methylprogesterone
15. 9α-Fluoro-11β-hydroxy-16α-methylprogesterone
16. 9α-Fluoro-11β-hydroxy-16β-methylprogesterone
17. Progesterone
18. 11β,17α-Hydroxy-19-nor-progesterone
19. 19-Nor-progesterone
20. 11β-Hydroxy-19-nor-progesterone.

The respective products obtained after treatment according to procedures 13A a) to e) outlined above are as follows:

1. 16α-Methyl-17α,20-isopropylidenedioxy-4,5-seco-3-pregnyn-5-one
2. 16β-Methyl-17α,20-isopropylidenedioxy-4,5-seco-3-pregnyn-5-one
3. 11β-Acetoxy-17α,20-isopropylidenedioxy-4,5-seco-3-pregnyn-5-one
4. 9α-Fluoro-11β-hydroxy-17α,20-isopropylidenedioxy-4,5-seco-3-pregnyn-5-one
5. 11β-Acetoxy-16α-methyl-17α,20-isopropylidenedioxy-4,5-seco-3-pregnyn-5-one
6. 11β-Acetoxy-16β-methyl-17α,20-isopropylidenedioxy-4,5-seco-3-pregnyn-5-one
7. 9α-Fluoro-11β-hydroxy-16α-methyl-17α,20-isopropylidenedioxy-4,5-seco-3-pregnyn-5-one
8. 9α-Fluoro-11β-hydroxy-16β-methyl-17α,20-isopropylidenedioxy-4,5-seco-3-pregnyn-5-one
9. 16α-Methyl-20-acetoxy-4,5-seco-3-pregnyn-5-one
10. 16β-Methyl-20-acetoxy-4,5-seco-3-pregnyn-5-one
11. 11β,20-Diacetoxy-4,5-seco-3-pregnyn-5-one
12. 9α-Fluoro-11β-hydroxy-20-acetoxy-4,5-seco-3-pregnyn-5-one
13. 16α-Methyl-11β,20-diacetoxy-4,5-seco-3-pregnyn-5-one
14. 16β-Methyl-11β,20-diacetoxy-4,5-seco-3-pregnyn-5-one
15. 9α-Fluoro-11β-hydroxy-16α-methyl-20-acetoxy-4,5-seco-3-pregnyn-5-one
16. 9α-Fluoro-11β-hydroxy-16β-methyl-20-acetoxy-4,5-seco-3-pregnyn-5-one
17. 20-Acetoxy-4,5-seco-3-pregnyn-5-one
18. 11β-Acetoxy-17β,20-isopropylidenedioxy-19-nor-4,5-seco-3-pregnyn-5-one
19. 20-Acetoxy-4,5-seco-3-pregnyn-5-one
20. 11β,20-Diacetoxy-19-nor-4,5-seco-3-pregnyn-5-one.

B. Alkylation of the 4,5-seco products at C-6 and C-10

By treating each of the 4,5-seco-3-pregnyne products listed in above Example 13A under Nos. 1) through 17) with sodium amide in liquid ammonia followed by ethylene bromide according to the procedure of Example 10A, there is obtained the corresponding 6,6-ethylene derivative thereof. Similarly, by treating each of the products listed in Example 13A under Nos. 1) through 17) with sodium hydride in tetrahydrofuran followed by treatment with pentamethylene dibromide according to the procedure of Example 4A, there is obtained the corresponding 6,6-pentamethylene derivative thereof.

By treating each of the 19-nor-3-pregnyne products listed in Example 13A under Nos. 18) through 20) in tetrahydrofuran with sodium hydride followed by n-propyl iodide according to procedure 8D, there is obtained the corresponding 10β-n-propyl derivative, i.e. 10β-n-propyl-11β-acetoxy-17α,20-isopropylidenedioxy-4,5-seco-3-pregnyn-5-one, 10β-n-propyl-20-acetoxy-4,5-seco-3-pregnyn-5-one and 10β-n-propyl-11β,20diacetoxy-4,5-seco-3-pregnyn-5-one.

C. Ring closure of alkylated 4,5-seco derivatives

Treat each of the 6,6-ethylene derivatives prepared as described in above Example 13B, first paragraph, and each of the 10β-n-propyl derivatives prepared as described in Example 13B, third paragraph, in the manner described in procedures 11A through 11D together with the procedure of Example 8G for hydrolysis of any 11 and/or 20-acetate esters which may be present, and there will be obtained the following respective products:

1. 6,6-Ethyleno-16α-methyl-17α-hydroxyprogesterone
2. 6,6-Ethylene-16β-methyl-17α-hydroxyprogesterone
3. 6,6-Ethylene-11β,17α-hydroxyprogesterone
4. 6,6-Ethylene-9α-fluoro-11β,17α-dihydroxyprogesterone
5. 6,6-Ethylene-11β,17α-dihydroxy-16α-methylprogesterone
6. 6,6-Ethylene-11β,17α-dihydroxy-16β-methylprogesterone
7. 6,6-Ethylene-9α-fluoro-11β,17α-dihydroxy-16α-methylprogesterone
8. 6,6-Ethylene-9α-fluoro-17α-hydroxy-16β-methylprogesterone
9. 6,6-Ethylene-16α-methylprogesterone
10. 6,6-Ethylene-16β-methylprogesterone
11. 6,6-Ethylene-11β-hydroxyprogesterone
12. 6,6-Ethylene-9α-fluoro-11β-hydroxyprogesterone
13. 6,6-Ethylene-11β-hydroxy-16α-methylprogesterone
14. 6,6-Ethylene-11β-hydroxy-16β-methylprogesterone
15. 6,6-Ethylene-9α-fluoro-11β-hydroxy-16α-methylprogesterone
16. 6,6-Ethylene-9α-fluoro-11β-hydroxy-16β-methylprogesterone
17. 6,6-Ethylene-progesterone
18. 10β-n-Propyl-11β,17α-dihydroxy-19-nor-progesterone
19. 10β-n-Propyl-19-nor-progesterone
20. 10β-n-Propyl-11β-hydroxy-19-nor-progesterone

EXAMPLE 14

21-Oxygenated-4,5-seco-3-pregnynes and alkylated derivatives produced therefrom

A. Treat each of the starting compounds listed below in the following manner:

a. Prepare the 17α,20;20,21-bismethylenedioxy derivative according to known procedures as outlined in the first paragraph of Example 12A.

b. In any 9-unsubstituted corticoid having an 11β-hydroxyl group, esterify the 11β-hydroxyl group according to procedures such as described in Example 8A.

c. Treat each of the resulting derivatives prepared in steps a) and b) with alkaline hydrogen peroxide followed by treatment of the 4,5-oxido compounds thereby formed with p-toluenesulfonylhydrazine according to the procedures of Examples 6A and 6B.

1. 2α-Methyl-4-pregnene-17α,21-diol-3,11,20-trione
2. 9α-Fluoro-4-pregnene-17α,21-diol-3,11,20-trione
3. 16α-Methyl-4-pregnene-17α,21-diol-3,11,20-trione
4. 16β-Methyl-4-pregnene-17α,21-diol-3,11,20-trione
5. 2α,16α-Dimethyl-4-pregnene-17α,21-diol-3,11,20-trione
6. 2α,16β-Dimethyl-4-pregnene-17α,21-diol-3,11,20-trione
7. 2α-Methyl-9α-fluoro-4-pregnene-11β,21-diol-3,11,20-trione
8. 9α-Fluoro-16α-methyl-4-pregnene-17α,21-diol-3,11,20-trione
9. 9α-Fluoro-16β-methyl-4-pregnene-17α,21-diol-3,11,20trione
10. 2α,16α-Dimethyl-9α-fluoro-4-pregnene-17α,21-diol-3,11,20-trione
11. 2α,16β-Dimethyl-9α-fluoro-4-pregnene-17α,21-diol-3,11,20-trione
12. 4-Pregnene-11β,17α,21-triol-3,20-dione
13. 2α-Methyl-4-pregnene-11β,17α,21-triol-3,20-dione
14. 9α-Fluoro-4-pregnene-11β,17α,21-triol-3,20-dione
15. 16α-Methoxy-4-pregnene-11β,17α,21-triol-3,20-dione
16. 16α-Methyl-4-pregnene-11β,17α,21-triol-3,20-dione
17. 16β-Methyl-4-pregnene-11β,17α,21-triol-3,20-dione
18. 2α,16α-Dimethyl-4-pregnene-11β,17α,21-triol-3,20-dione
19. 2α,16β-Dimethyl-4-pregnene-11β,17α,21-triol-3,20-dione
20. 2α-Methyl-9α-fluoro-4-pregnene-11β,17α,21-triol-3,20-dione
21. 9α-Fluoro-16α-methyl-4-pregnene-11β,17α,21-triol-3,20-dione
22. 9α-Fluoro-16β-methyl-4-pregnene-11β,17α,21-triol-3,20-dione
23. 2α,16α-Dimethyl-9α-fluoro-4-pregnene-11β,17α,21-triol-3,20-dione
24. 2α,16β-Dimethyl-9α-fluoro-4-pregnene-11β,17α,21-triol-3,20-dione
25. 16α-Methyl-4-pregnene-17α,21-diol-3,20-dione
26. 16β-Methyl-4-pregnene-17α,21-diol-3,20-dione
27. 2α,16α-Dimethyl-4-pregnene-17α,21-diol-3,20-dione
28. 2α,16β-Dimethyl-4-pregnene-17α,21-diol-3,20-dione.

The respective resultant products obtained when the above compounds are treated in accordance with steps a) through c) listed above are as follows:

1. 2α-Methyl-17α,20;20,21-bismethylenedioxy-4,5-seco-3-pregnyne-5,11-dione
2. 9α-Fluoro-17α,20;20,21-bismethylenedioxy-4,5-seco-3-pregnyne-5,11-dione
3. 16α-Methyl-17α,20;20,21-bismethylenedioxy-4,5-seco-3-pregnyne-5,11-dione
4. 16β-Methyl-17α,20;20,21-bismethylenedioxy-4,5-seco-3-pregnyne-5,11-dione
5. 2α,16α-Dimethyl-17α,20;20,21-bismethylenedioxy-4,5-seco-3-pregnyne-5,11-dione
6. 2α,16β-Dimethyl-17α,20;20,21-bismethylenedioxy-4,5-seco-3-pregnyne-5,11-dione
7. 2α-Methyl-9α-fluoro-17α,20;20,21-bismethylenedioxy-4,5-seco-3-pregnyne-5,11-dione
8. 9α-Fluoro-16α-methyl-17α,20;20,21-bismethylenedioxy-4,5-seco-3-pregnye-5,11-dione
9. 9α-Fluoro-16β-methyl-17α,20;20,21-bismethylenedioxy-4,5-seco-3-pregnyne-5,11-dione
10. 2α,16α-Dimethyl-9α-fluoro-17α,20;20,21-bismethylenedioxy-4,5-seco-3-pregnyne-5,11-dione
11. 2α,16β-Dimethyl-9α-fluoro-17α,20;20,21-bismethylenedioxy-4,5-seco-3-pregnyne-5,11-dione
12. 11β-Acetoxy-17α,20;20,21-bismethylenedioxy-4,5-seco-3-pregnyn-5-one
13. 2α-Methyl-11β-acetoxy-17α,20;20,21-bismethylenedioxy-4,5-seco-3-pregnyn-5-one
14. 9α-Fluoro-11β-hydroxy-17α,20;20,21-bismethylenedioxy-4,5-seco-3-pregnyn-5-one
15. 11β-Acetoxy-16α-methoxy-17α,20;20,21-bismethylenedioxy-4,5-seco-3-pregnyn-5-one
16. 11β-Acetoxy-16α-methyl-17α,20;20,21-bismethylenedioxy-4,5-seco-3-pregnyn-5-one 17. 11β-Acetoxy-16β-methyl-17α,20;20,21-bismethylenedioxy-4,5-seco-3-pregnyn-5-one
18. 2α,16α-Dimethyl-11β-acetoxy-17α,20;20,21-bismethylenedioxy-4,5-seco-3-pregnyn-5-one
19. 2α,16β-Dimethyl-11β-acetoxy-17α,20;20,21-bismethylenedioxy-4,5-seco-3-pregnyn-5-one
20. 2α-Methyl-9α-fluoro-11β-hydroxy-17α,20;20,21-bismethylenedioxy-4,5-seco-3-pregnyn-5-one
21. 9α-Fluoro-11β-hydroxy-16α-methyl-17α,20;20,21-bismethylenedioxy-4,5-seco-3-pregnyn-5-one
22. 9α-Fluoro-11β-hydroxy-16β-methyl-17α,20;20,21-bismethylenedioxy-4,5-seco-3-pregnyn-5-one
23. 2α,16α-Dimethyl-9α-fluoro-11β-hydroxy-17α,20;20,21-bismethylenedioxy-4,5-seco-3-pregnyn-5-one
24. 2α,16β-Dimethyl-9α-fluoro-11β-hydroxy-17α,20;20,21-bismethylenedioxy-4,5-seco-3-pregnyn-5-one
25. 16α-Methyl-17α,20;20,21-bismethylenedioxy-4,5-seco-3-pregnyn-5-one
26. 16β-Methyl-17α,20;20,21-bismethylenedioxy-4,5-seco-3-pregnyn-5-one
27. 2α,16α-Dimethyl-17α,20;20,21-bismethylenedioxy-4,5-seco-3-pregnyn-5-one
28. 2α,16β-Dimethyl-17α,20;20,21-bismethylenedioxy-4,5-seco-3-pregnyn-5-one.

B. Alkylation at C-6 of the 4,5-seco compounds of Example 14A

Treat each of products 1 through 28 of Example 14A in ethylene glycol dimethyl ether with n-butyl lithium followed by methyl iodide in the following manner:

Inject 25 ml. of 6.6M n-butyl lithium in hexane into a dry nitrogen filled flask. Evaporate the hexane in vacuo and to the resultant semi-solid residue add in small portions 15 ml. of dry ethylene glycol dimethyl ether. Then add to this mixture in 3 ml. portions, 2 mmoles of 4,5-seco steroids in 18 ml. of ethylene glycol dimethyl ether. Stir the solution at room temperature for 1.5 hours, then add 2 mmoles methyl iodide and continue stirring for another 45 minutes. Add 20 ml. of 3% hydrochloric acid, then dilute the reaction mixture with ether and water to a total of 100 ml. Wash the ether extracts with aqueous sodium bicarbonate, then water and dry over sodium sulfate. Distill the solvents in vacuo to a residue comprising the corresponding 6-methyl derivative of each of the 4,5-seco 3-pregnyne compounds of Example 14A-1 through 28.

Similarly, by treating each of the 4,5-seco-3-pregnyne compounds of Example 14A (i.e. products 1-28), in liquid ammonia with sodium amide followed by methylene dibromide in a manner similar to that described in Example 10A, there is obtained the respective 6,6-ethylene derivative of each of the 4,5-seco compounds of Example 14A-1 through 28.

C. Ring Closure of the alkylated derivatives of 4,5-seco compounds of Example 14B By treating each of the 6-methyl derivatives prepared as described in Example 14B, first paragraph, according to procedures such as described in Examples 10B - D, and, in the case of the 11-acetylated intermediates, by also subjecting it to the action of *Flavobacterium dehydrogenans* according to procedure 8G, there are obtained the respective 6α-methyl-21-acetate ester derivatives of the starting compounds listed in Example 14B.

By treating the 6,6-ethylene derivatives prepared as described in Example 14B, second paragraph, according to procedures such as described in Examples 6D, E and F and in the case of intermediates possessing an 11-acetoxy group, according to procedures described in Example 8G, there are obtained the respective 6,6-ethylene 21-acetate ester derivatives of the starting compounds listed in Example 14A, i.e.

1. 6,6-Ethylene-2α-methyl-4-pregnene-17α,21-diol-3,11,20-trione 21-acetate
2. 6,6-Ethylene-9α-fluoro-4-pregnene-17α,21-diol-3,11,20-trione 21-acetate
3. 6,6-Ethylene-16α-methyl-4-pregnene-17α,21-diol-3,11,20-trione 21-acetate
4. 6,6-Ethylene-16β-methyl-4-pregnene-17α,21-diol-3,11,20-trione 21-acetate
5. 6,6-Ethylene-2α,16α-Dimethyl-4-pregnene-17α,21-diol-3,11,20-trione 21-acetate
6. 6,6-Ethylene-2α,16β-dimethyl-4-pregnene-17α,21-diol-3,11,20-trione 21-acetate
7. 6,6-Ethylene-2α-methyl-9α-fluoro-4-pregnene-11β,21-diol-3,11,20-trione 21-acetate
8. 6,6-Ethylene-9α-fluoro-16α-methyl-4-pregnene-17α,21-diol-3,11,20-trione 21-acetate
9. 6,6-Ethylene-9α-fluoro-16β-methyl-4-pregnene-17α,21-diol-3,11,20-trione 21-acetate
10. 6,6-Ethylene-2α,16α-dimethyl-9α-fluoro-4-pregnene-17α,21-diol-3,11,20-trione 21-acetate
11. 6,6-Ethylene-2α,16β-dimethyl-9α-fluoro-4-pregnene-17α,21-diol-3,11,20-trione 21-acetate
12. 6,6-Ethylene-4-pregnene-11β,17α,21-triol-3,20-dione 21-acetate
13. 6,6-Ethylene-2α-methyl-4-pregnene-11β,17α,21-triol-3,20-dione 21-acetate
14. 6,6-Ethylene-9α-fluoro-4-pregnene-11β,17α,21-triol-3,20-dione 21-acetate
15. 6,6-Ethylene-16α-methoxy-4-pregnene-11β,17α,21-triol-3,20-dione 21-acetate
16. 6,6-Ethylene-16α-methyl-4-pregnene-11β,17α,21-triol-3,20-dione 21-acetate
17. 6,6-Ethylene-16β-methyl-4-pregnene-11β,17α,21-triol-3,20-dione 21-acetate
18. 6,6-Ethylene-2α,16α-dimethyl-4-pregnene-11β,17α,21-triol-3,20-dione 21-acetate
19. 6,6-Ethylene-2α,16β-dimethyl-4-pregnene-11β,17α,21-triol-3,20-dione 21-acetate
20. 6,6-Ethylene-2α-methyl-9α-fluoro-4-pregnene-11β,17α,21-triol-3,20-dione 21-acetate
21. 6,6-Ethylene-9α-fluoro-16α-methyl-4-pregnene-11β,17α,21-triol-3,20-dione 21-acetate
22. 6,6-Ethylene-9α-fluoro-16β-methyl-4-pregnene-11β,17α,21-triol-3,20-dione 21-acetate
23. 6,6-Ethylene-2α,16α-dimethyl-9α-fluoro-4-pregnene-11β,17α,21-triol-3,20-dione 21-acetate
24. 6,6-Ethylene-2α,16β-dimethyl-9α-fluoro-4-pregnene-11β,17α,21-triol-3,20-dione 21-acetate
25. 6,6-Ethylene-16α-methyl-4-pregnene-17α,21-diol-3,20-dione 21-acetate

I claim:

1. A compound selected from the group consisting of 5-keto-4,5-seco-3-pregnynes having the following formula:

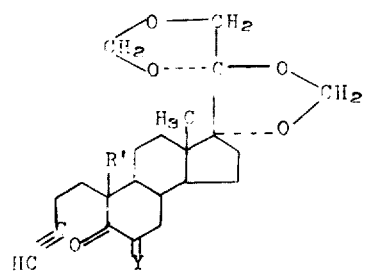

wherein R' is a member selected from the group consisting of hydrogen and alkyl having up to 12 carbon atoms; said alkyl being saturated or unsaturated;

Y is a member selected from the group consisting of hydrogen,

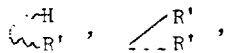

and polymethylene having from 2 to 8 carbon atoms; and the 11-keto analogs thereof.

2. A compound according to claim 1 wherein Y is hydrogen.

3. An 11-keto analog of a compound according to claim 1 wherein R' is methyl, Y is a member selected from the group consisting of hydrogen and

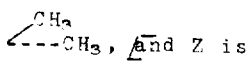 and Z is

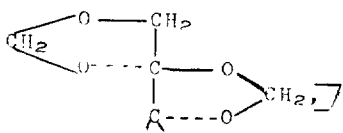

said compound being a member selected from the group consisting of 17α,20;20,21-bismethylenedioxy-4,5-seco-3-pregnyne-5,11-dione and the 6,6-dimethyl-derivative thereof.

4. A compound according to claim 1 wherein R' is methyl, Y is a member selected from the group consisting of hydrogen, dimethyl, and ethylene, said compound being a member selected from the group consisting of 17α,20;20,21-bismethylenedioxy-4,5-seco-3-pregnyn-5-one and the 6,6-dimethyl- and the 6,6-ethylene-derivatives thereof.

* * * * *

UNITED STATES PATENT AND TRADEMARK OFFICE
CERTIFICATE OF CORRECTION

PATENT NO. : 3,891,677
DATED : June 24, 1975
INVENTOR(S) : Masato Tanabe

It is certified that error appears in the above-identified patent and that said Letters Patent are hereby corrected as shown below:

First page, penultimate line of Abstract, "4,5-sec. steroid" should read --4,5-seco steroid--. Column 2, line 28, "C. 7,8-secol6(7)" should read --C. 7,8-seco-6(7)--. Column 4, Chart A, Flow Diagram (d), Formula I'd, " 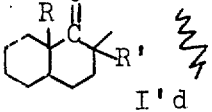 " should read -- 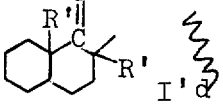 --.

Column 5, lines 25-29, " 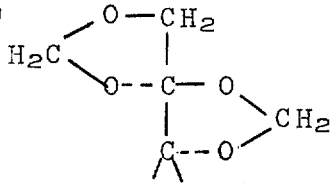 " should read

-- 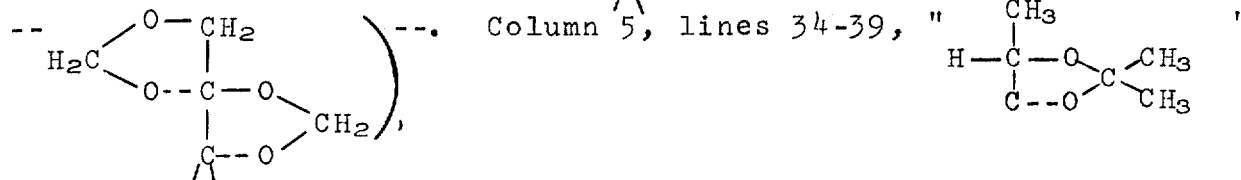 --. Column 5, lines 34-39, " 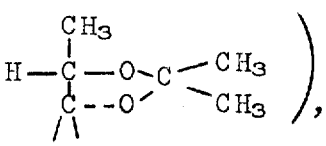 "

should read -- 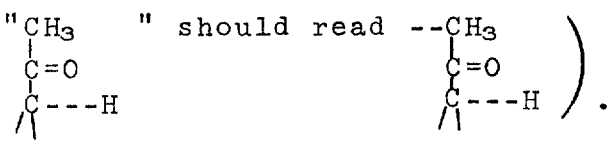 --. Column 5, lines 42-46,

"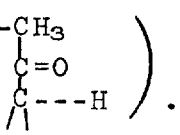" should read --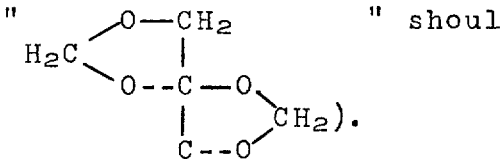--. Column 6, lines 10-15,

" 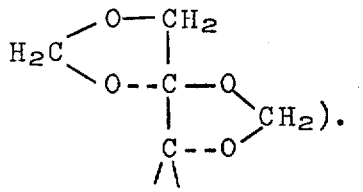 " should read -- 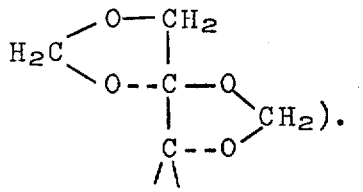 --.

UNITED STATES PATENT AND TRADEMARK OFFICE
CERTIFICATE OF CORRECTION

PATENT NO. : 3,891,677
DATED : June 24, 1975
INVENTOR(S) : Masato Tanabe

Page 2 of 3

It is certified that error appears in the above-identified patent and that said Letters Patent are hereby corrected as shown below:

Column 6, line 22, "I (i a-f) and" should read --I (a-f) and--. Column 7, line 19, "Δ-steroid" should read --Δ$^4$-steroid--. Column 7, Ring Closure Process A, "$\underline{He(OAu)_2 \, H_2SO_4}$ ⟶" should read
$\phantom{xxxxxxxxxxxxxxxxxxxxxxxxx}$ 90% HAc --$\underline{Hg(OAu)_2 \cdot H_2SO_4}$ ⟶--. Column 7, Process B, "$\underline{HeO/CF_3COOH}$ ⟶ "
$\phantom{--}$90% HAc $\phantom{xxxxxxxxxxxxxxxxxxxxxxxxxxxxxx}$ Aqueous
$\phantom{xxxxxxxxxxxxxxxxxxxxxxxxxxxxxxxxxxxxxxxxxxxx}$ Dioxane should read --$\underline{HgO/CF_3COOH}$ ⟶ --. Column 10, Chart B, Formula 1a,
$\phantom{xxxxxxxxxxx}$90% Aqueous
$\phantom{xxxxxxxxxxxxx}$Dioxane

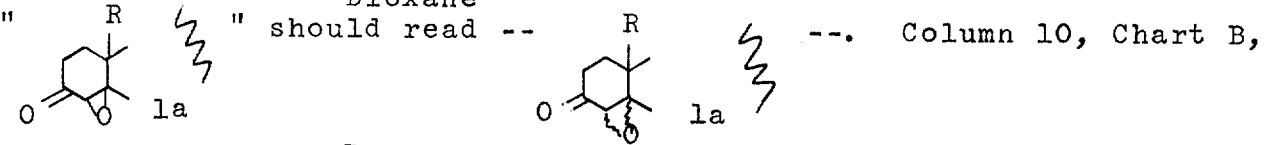

Formula 2ab, " " should read -- --.

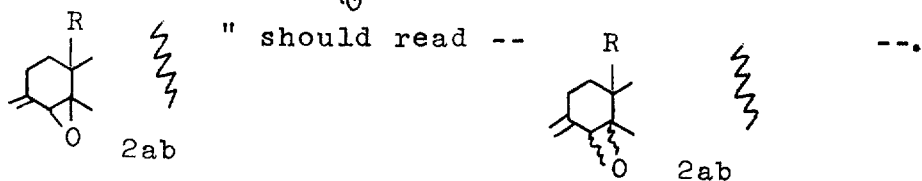

Column 10, Chart B, under Formula 1', "(R H$_1$CH$_3$)" should read --(R=H$_1$CH$_3$)--. Column 12, line 1, "and/or C-b10 are" should read --and/or C-10 are--. Column 16, line 4, "(C=O). -seco- and for making" should read --(C=O).--. Column 19, line 32, "9.32 𝜋 (C$_{18}$-CH$_3$)" should read --9.32 𝜏(C$_{18}$-CH$_3$)--. Column 23, line 6, "-17α,20;20,2120;20,21-" should read --17α,20;20,21--. Column 23, line 55, "-17β,20;20,21-" should read --17α,20;20,21--. Column 23, line 57, "C. 17β,20;20,21-" should read --C. 17α,20;20,21--. Column 23, lines 66 and 67, "D. 1-0β-n-Propyl-" should read --D. 10β-n-Propyl--. Column 26, line 19, "-10α-n-propyl-" should read --10β-n-propyl--. Column 26, lines 21 and 22, "(i.e. 10α-n-propyl-" should read --(i.e. 10β-n-propyl--. Column 33, line 32, "of 6.6 M" should read --of 1.6 M--. Column 34, line 55 should read as follows. --26) 6,6-Ethylene-16β-methyl-4-pregnene-17α,21-

UNITED STATES PATENT AND TRADEMARK OFFICE
CERTIFICATE OF CORRECTION

PATENT NO. : 3,891,677  Page 3 of 3
DATED : June 24, 1975
INVENTOR(S) : Masato Tanabe It is certified that error appears in the above—identified patent and that said Letters Patent are hereby corrected as shown below:

diol-3,20-dione 21-acetate 27) 6,6-Ethylene-$2\alpha,16\alpha$-dimethyl-4-pregnene-$17\alpha$,21-diol-3,20-dione 21-acetate 28) 6,6-Ethylene-$2\alpha,16\beta$-methyl-4-pregnene-$17\alpha$,21-diol-3,20-dione 21-acetate. Example 15 The protective groups present in each of the 4,5-seco steroids prepared in Examples 12A and B, 13A and B and 14A and B may be removed according to procedures similar to those described respectively in Examples 12C, 13C and 14C and there will be obtained the corresponding 4,5-seco-3-androstyn-5-ones, 21-desoxy-4,5-seco-3-pregnyn-5-ones and 21-oxygenated 4,5-seco-3-pregnyn-5-ones having functions at C-11 and side chains at C-17 similar to those present in the starting compounds listed in each of Examples 12-14.--. Columns 35 and 36, Claim 3, "$\underset{\diagdown\text{----CH}_3}{\diagup\text{CH}_3}$, $\big[$ and Z is $\underset{\diagdown\text{O---}}{\overset{\diagup\text{O----CH}_2}{\text{CH}_2}}\underset{\diagdown\text{C--O}}{\overset{\diagup}{\text{C--O}}}\underset{}{\text{CH}_2,}\big]$ said compound being a" should read -- $\underset{\diagdown\text{----CH}_3}{\diagup\text{CH}_3}$, said compound being a--. (Amendment C as amended 12/9/74).

Signed and Sealed this

Twentieth Day of July 1976

[SEAL]

Attest:

RUTH C. MASON
Attesting Officer

C. MARSHALL DANN
Commissioner of Patents and Trademarks